United States Patent [19]
Teramachi et al.

[11] Patent Number: 6,085,473
[45] Date of Patent: Jul. 11, 2000

[54] THREE-DIMENSIONAL GUIDING APPARATUS

[75] Inventors: Hiroshi Teramachi; Yoshikazu Suga; Shigeru Wako; Masashi Konomoto; Hirokazu Ishikawa; Tadashi Hirokawa, all of Tokyo, Japan

[73] Assignee: THK Co., Ltd., Tokyo, Japan

[21] Appl. No.: 09/155,957

[22] PCT Filed: Jul. 31, 1997

[86] PCT No.: PCT/JP97/02643

§ 371 Date: Feb. 23, 1999

§ 102(e) Date: Feb. 23, 1999

[87] PCT Pub. No.: WO98/35117

PCT Pub. Date: Aug. 13, 1998

[30]    Foreign Application Priority Data

Feb. 5, 1997  [JP]  Japan .......................................... 9-37072

[51] Int. Cl.[7] ................................. E04B 1/98; E04H 9/02
[52] U.S. Cl. ......................... 52/167.5; 52/167.1; 52/167.4
[58] Field of Search ................................. 52/167.1, 167.4, 52/167.5, 167.6, 167.7

[56]    References Cited

U.S. PATENT DOCUMENTS

| 5,261,200 | 11/1993 | Sasaki et al. ........................... 52/167.5 |
| 5,442,883 | 8/1995 | Nishimura et al. ................ 52/167.1 X |
| 5,934,029 | 8/1999 | Kawai et al. ........................... 52/167.5 |
| 5,970,666 | 10/1999 | Kurabayashi et al. ............. 52/167.4 X |

FOREIGN PATENT DOCUMENTS

| 8-240033 | 9/1986 | Japan . |
| 63-186028 | 8/1988 | Japan . |

*Primary Examiner*—Beth A. Stephan
*Assistant Examiner*—Brian E. Glessner
*Attorney, Agent, or Firm*—Wenderoth, Lind & Ponack, L.L.P.

[57]    ABSTRACT

The present invention relates to a three-dimensional guiding apparatus capable of bearing large loads and suitable for use in a vibration isolating structure for buildings. The three-dimensional guiding apparatus comprises a base 23, a first curved guiding apparatus 21 disposed above the base 23 and having an arcuate track, a second curved guiding apparatus 22 disposed above the first curved guiding apparatus 21 and having a plane of movement along an arcuate track which crosses the plane of movement of the first curved guiding apparatus 21, and an intermediate member 24 positioned between the first curved guiding apparatus 21 and the second curved guiding apparatus 22 and interconnecting the first curved guiding apparatus 21 and the second curved guiding apparatus 22. Each of the first and second curved guiding apparatuses 21, 22 has a track rail 1, a bearing block 10, lids 13, and a number of balls 9.

39 Claims, 30 Drawing Sheets

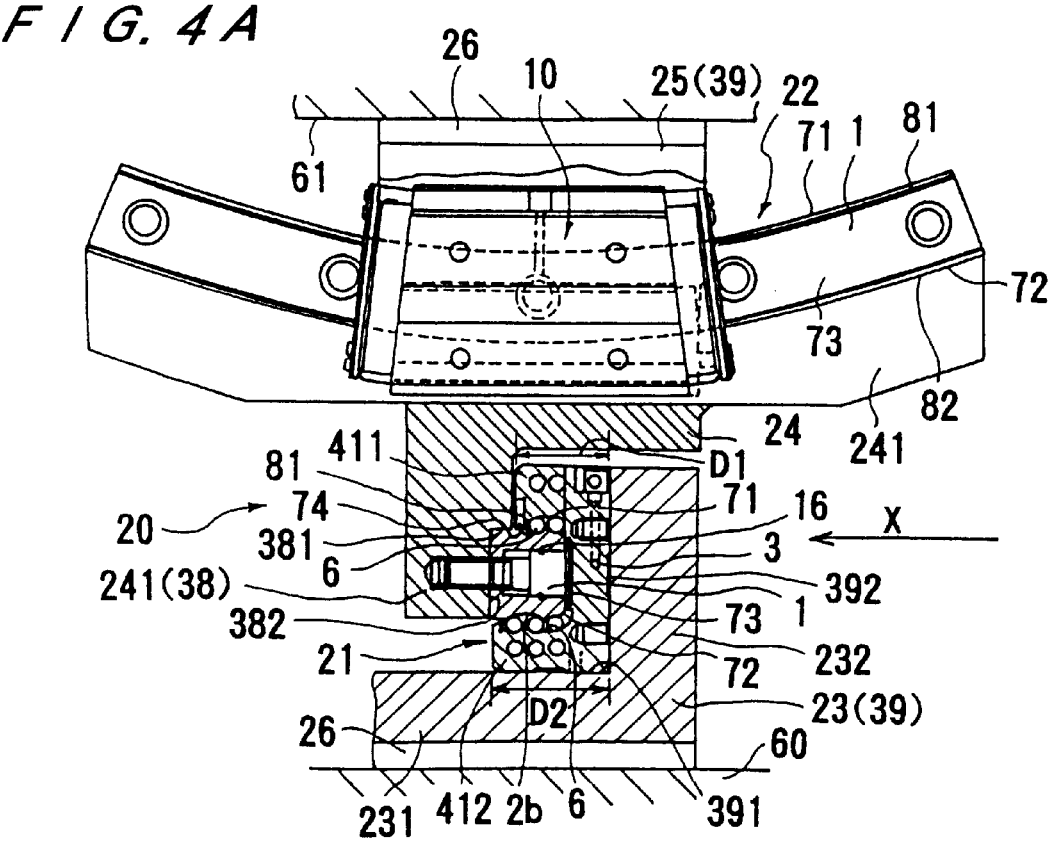
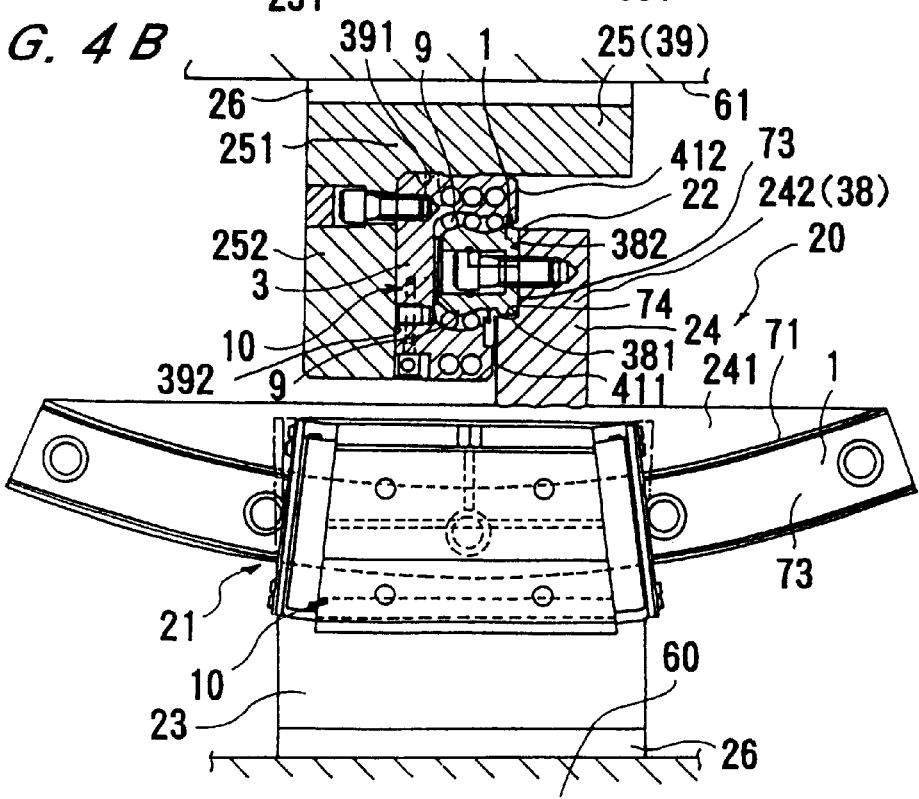

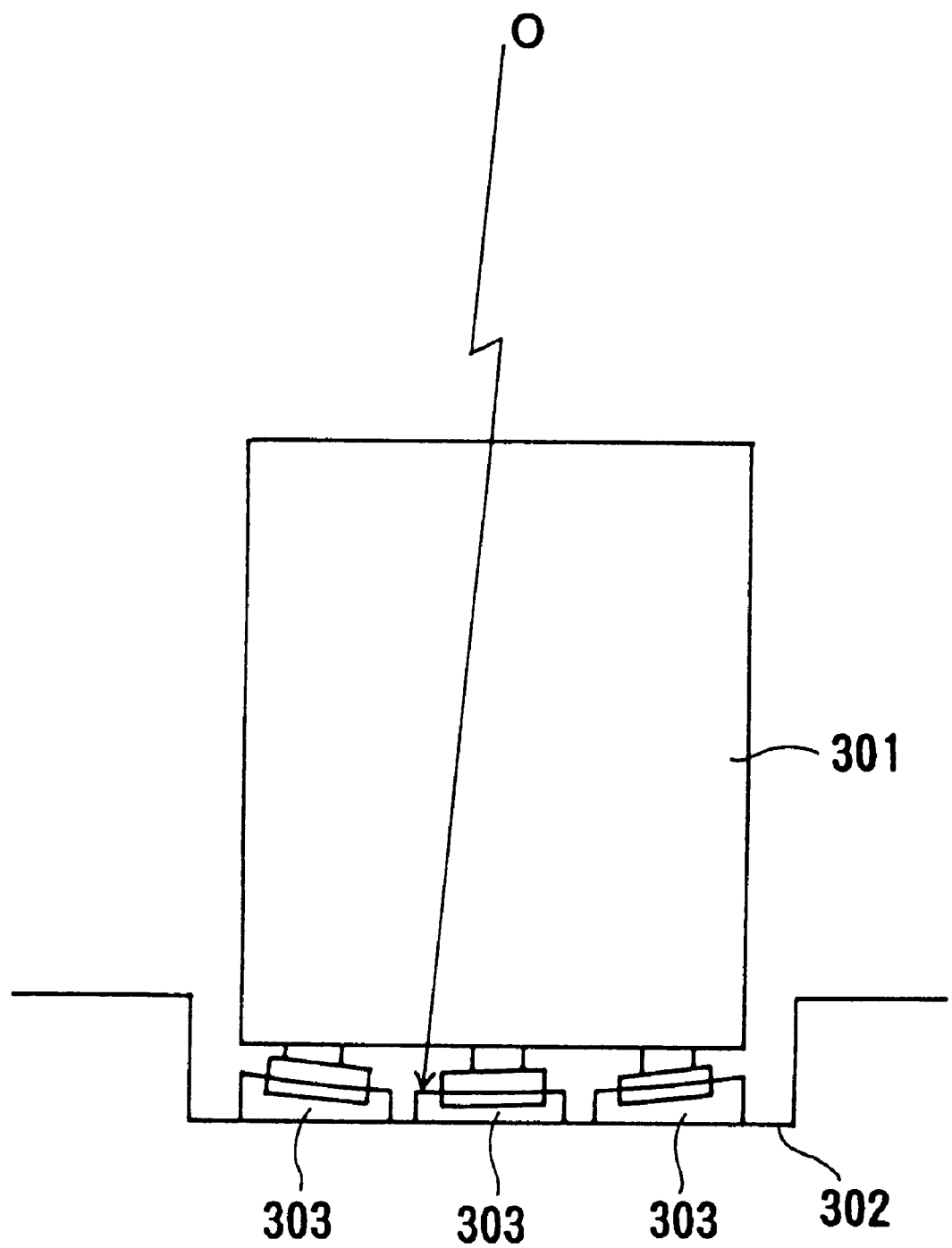
F I G. 1 3

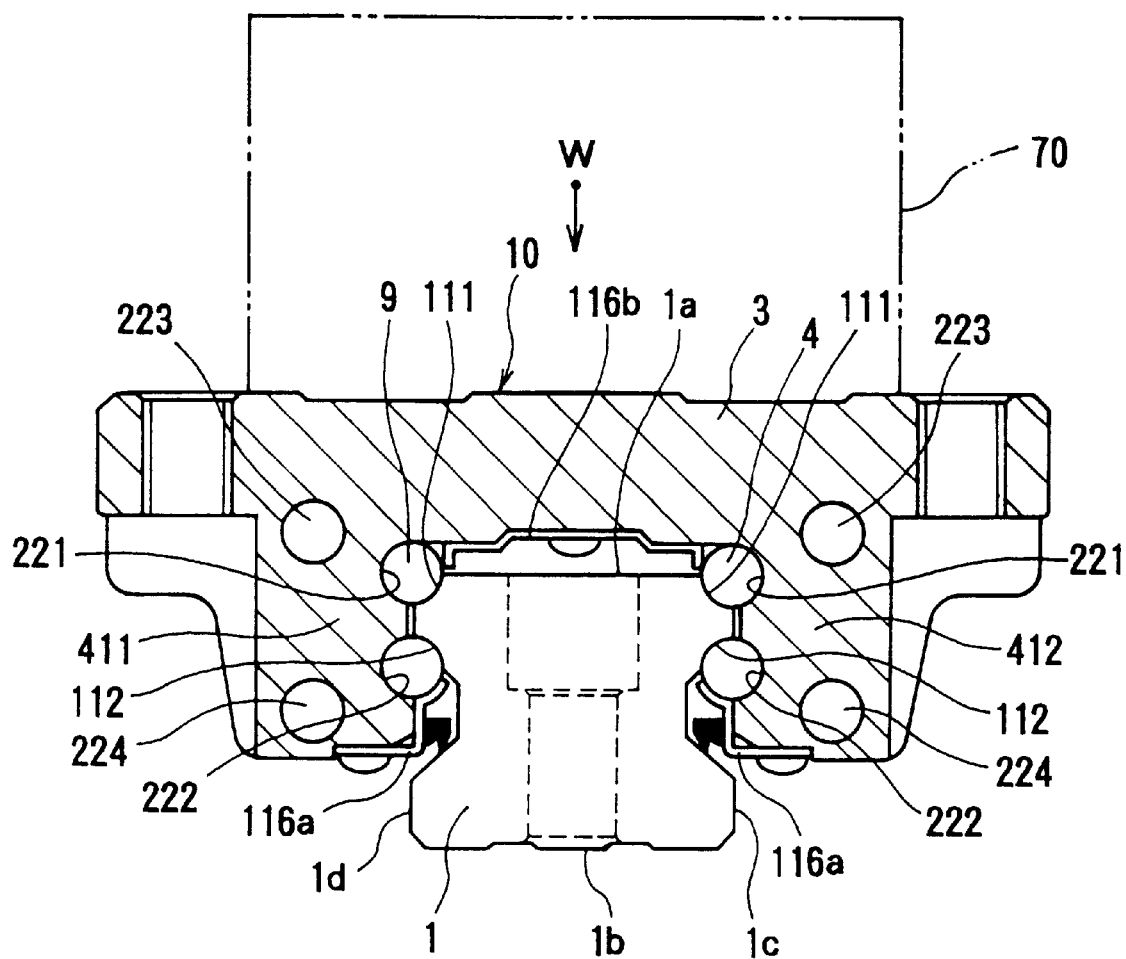
F I G. 19

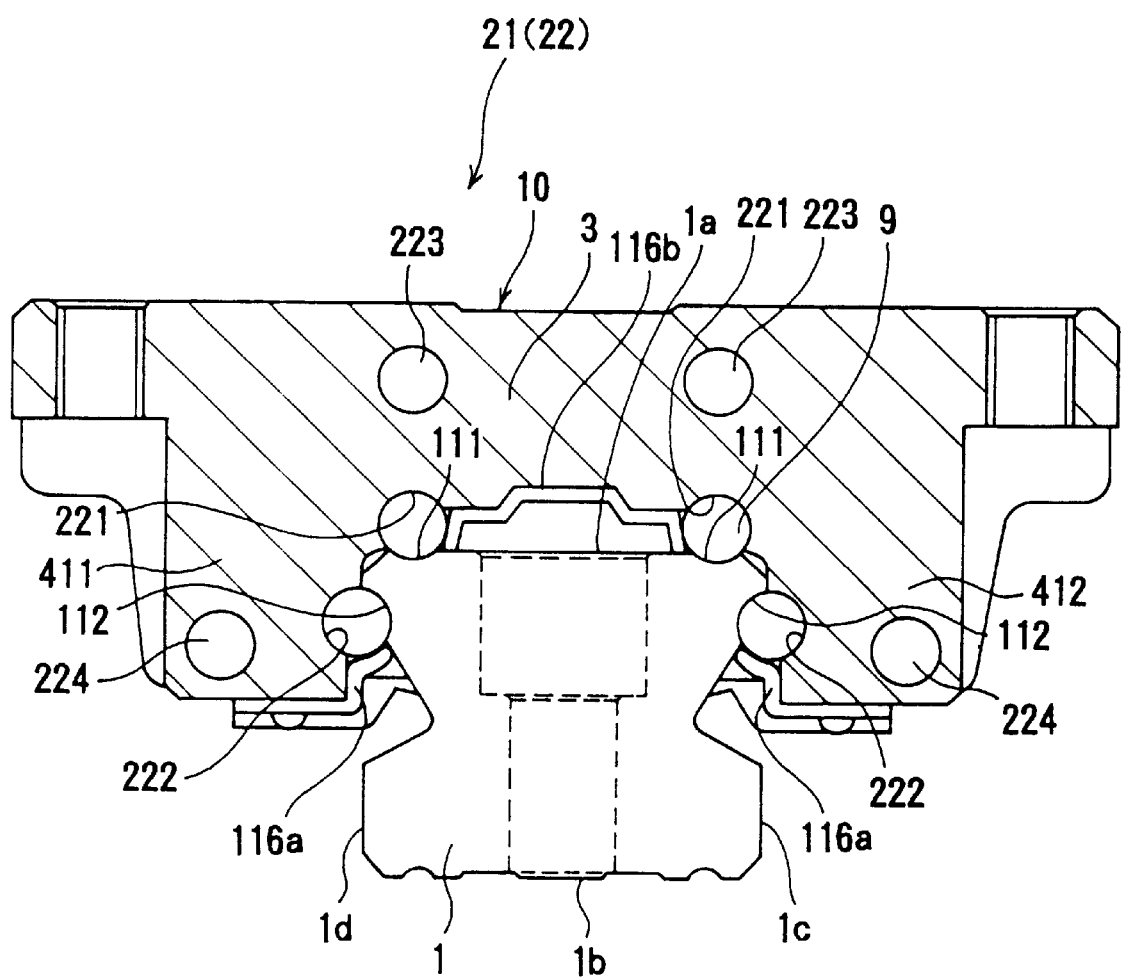
F I G. 21

F I G. 24
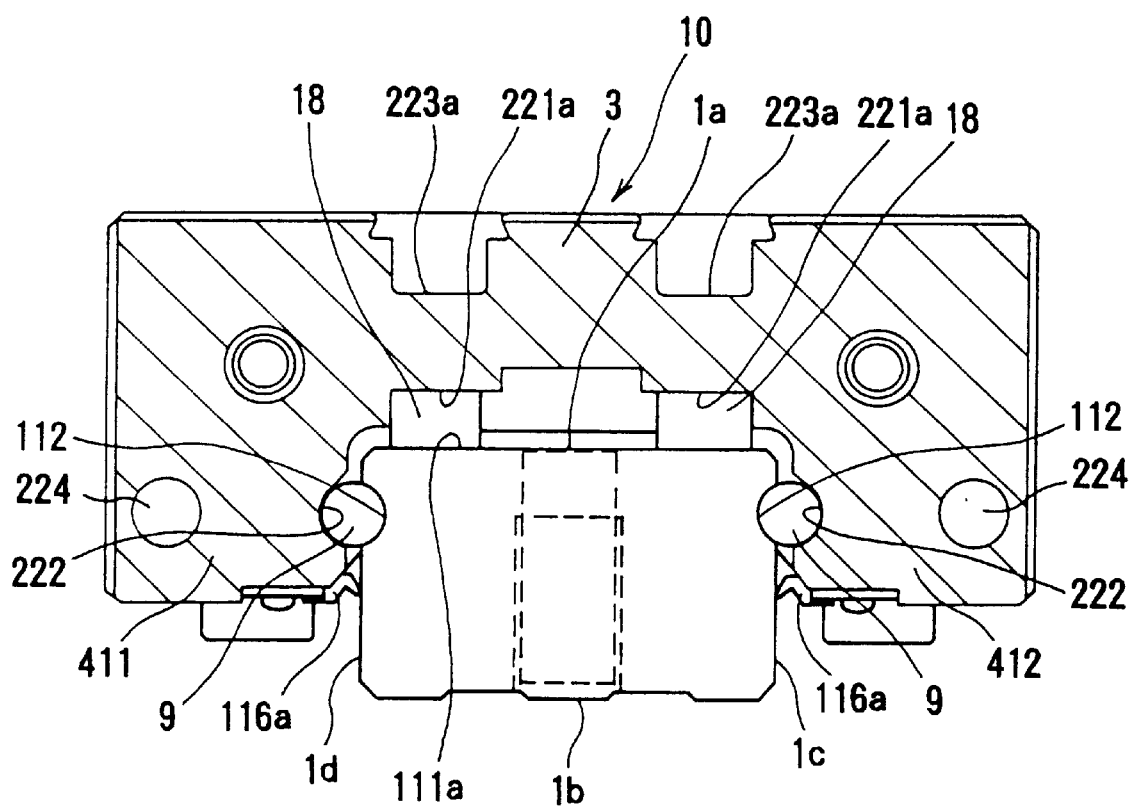

THREE-DIMENSIONAL GUIDING APPARATUS

TECHNICAL FIELD

The present invention relates to a three-dimensional guiding apparatus, and more particularly to a three-dimensional guiding apparatus suitable for use in a vibration isolator used in a vibration isolating floor structure.

BACKGROUND ART

Heretofore, some buildings have employed a vibration isolating structure specially designed to minimize the effect of seismic vibrations in view of the properties of the seismic vibrations. One such vibration-isolated building incorporates a vibration isolator disposed between the ground and the building for minimizing forces transmitted to the building due to earthquakes.

According to such a vibration isolator, as shown in FIGS. 12A and 12B of the accompanying drawings, a building 301 is not fixed to a foundation 302, but a plurality of guiding apparatuses 303 for allowing the building 301 to move on the foundation 302 are disposed between the foundation 302 and the building 301. When seismic forces higher than a certain level are applied, the building 301 slides on the guiding apparatuses 303 to prevent the seismic forces from acting on the building 301.

There has been proposed a curved guiding apparatus or a three-dimensional guiding apparatus using steel rollers or balls as the guiding apparatus.

One such guiding apparatus comprises a guide member having a downwardly convex arcuate surface and steel rollers disposed between the guide member and a lower end of a building which is complementary in shape to the guide member (see Japanese laid-open patent publication No. 6-346627). Another guiding apparatus comprises a downwardly convex spherical guide member mounted on a foundation and steel balls disposed between the guide member and a lower end of a building which is complementary in shape to the guide member (see Japanese laid-open patent publication No. 5-24823).

With the vibration isolating structure employing the curved guiding apparatus or the three-dimensional guiding apparatus as described above, when vibrations such as seismic vibrations are not applied, the building is stably held in a steady position on the three-dimensional guiding apparatus or the like. When an earthquake occurs and the ground vibrates, vibrations are isolated between the ground and the building by the three-dimensional guiding apparatus or the like, and no substantial seismic vibrations are transmitted to the building.

After the vibrations of the ground have disappeared, the vibrations of the building attenuates with respect to the ground, and the building is stabilized in the steady position on the three-dimensional guiding apparatus.

The three-dimensional guiding apparatuses which have heretofore been proposed are designed and produced to suit individual buildings. There have not been available any three-dimensional guiding apparatus as component units of the vibration isolating structure having sufficient load-resistant performance and smooth operability for use as guiding apparatus used in vibration isolating structures of vibration-isolated buildings. There has been a demand for such three-dimensional guiding apparatus.

It is therefore an object of the present invention to provide a three-dimensional guiding apparatus which is capable of bearing large loads and can be used in a vibration isolating structure of a vibration-isolated building.

DISCLOSURE OF INVENTION

To achieve the above object, there is provided in accordance with the present invention a three-dimensional guiding apparatus which, as shown in FIGS. 1 through 4, has a base 23, a first curved guiding apparatus 21 mounted on the base 23 and having an arcuate track, a second curved guiding apparatus 22 disposed above the first curved guiding apparatus 21 and having a plane of movement along an arcuate track which crosses the plane of movement of the first curved guiding apparatus 21, and an intermediate member 24 positioned between the first curved guiding apparatus 21 and the second curved guiding apparatus 22 and interconnecting the first curved guiding apparatus 21 and the second curved guiding apparatus 22. Each of the first and second curved guiding apparatuses 21, 22 comprises a track rail 1 vertically curved at a predetermined curvature and having ball rolling grooves 81, 82 defined along an arcuate shape of predetermined curvature in side surfaces; a bearing block 10 having a connecting portion 3 and a pair of skirts 411, 412 extending respectively from opposite ends of the connecting portion 3, the bearing block 10 including ball rolling grooves 6 defined in the skirts 411, 412 in alignment with the ball rolling grooves 81, 82 of the track rail 1 along an arcuate shape of predetermined curvature, and non-loading ball passages 8 defined in the skirts 411, 412 adjacent to the ball rolling grooves 6; a pair of lids 13 mounted respectively on front and rear ends of the bearing block 10 and having respective ball direction changing passages 15 defined in respective inner surfaces thereof, the ball direction changing passages 15 connecting ends of the ball rolling grooves 6 and the non-loading ball passages 8 to provide endless ball circulation paths; and a plurality of balls 9 disposed to circulate in the endless ball circulation paths for bearing loads between the ball rolling grooves 81, 82 in the track rail 1 and the ball rolling grooves 6 in the bearing block 10.

According to the present invention, a three-dimensional guiding apparatus has a base 23, an intermediate member 24 mounted on the base 23 by a first curved guiding apparatus 21 having a downwardly convex arcuate track, a moving base 25 mounted on the intermediate member 24 by a second curved guiding apparatus 22 having a plane of movement along a downwardly convex arcuate track which crosses the plane of movement of the first curved guiding apparatus 21. Each of the first and second curved guiding apparatuses 21, 22 comprises a track rail 1 having a substantially rectangular cross-sectional shape and longitudinally curved at a predetermined radius of curvature and having ball rolling grooves 81, 82 defined longitudinally in an upper side surface 71 closer to the center of curvature and a lower side surface 72 opposite to the upper side surface 71; a bearing block 10 having a connecting portion 3 and first and second skirts 411, 412 extending horizontally from upper and lower ends of the connecting portion 3 in confronting relation to the respective upper and lower side surfaces 71, 72 of the track rail 1, the first and second skirts 411, 412 having ball rolling grooves 6 and ball circulation paths; a number of load-bearing balls 9 disposed between the ball rolling grooves 81, 82 in the track rail 1 and the ball rolling grooves 6 in the skirts 411, 412 for circulation in the ball circulation paths; wherein the first skirt 411 on which vertical loads are not imposed has a dimension, in a direction in which the ball rolling grooves are juxtaposed, smaller than a dimension of the second skirt 412 on which vertical loads are imposed, and one of the upper and lower side surfaces of the track rail 1 has a surface on which vertical loads are not imposed and which is exposed as a horizontal attachment surface 74; and wherein the track trail is attached to a member 38 having a vertical attachment surface 382 and a horizontal attachment surface 381 extending horizontally from an end of the vertical attachment surface 382, the horizontal attachment surface 74 of the track rail 1 is held against the horizontal attachment surface 381 of the member 38, and a side surface 73 of the track rail 1 is attached to the vertical attachment surface 382 of the member 38.

A block attachment member 39 may have a horizontal attachment surface 391 and a vertical attachment surface 392, the skirt on which vertical loads are imposed being held against the horizontal attachment surface 391, and the connecting portion 3 of the bearing block being attached to the vertical attachment surface 392.

A plurality of curved guiding apparatuses may be juxtaposed at least between the base 23 and the intermediate member 24 and between the intermediate member 24 and the moving base 25. Each of the first and second curved guiding apparatuses may have a plurality of bearing blocks mounted on the track rail thereof.

Each of the ball rolling grooves 81 (82), 6 in the track rail 1 and the skirts 411, 412 of each of the first and second curved guiding apparatuses may have an arcuate surface having a radius of curvature slightly greater than the radius of the balls 9, the balls 9 being held in contact with each of the ball rolling grooves 81 (82), 6 at two confronting points, and straight lines interconnecting the points of contact of the balls may be inclined to a vertical line along which loads are applied, by an acute angle θ.

Each of the skirts 411, 412 may comprise a skirt body 12 and a lid 13 mounted on an end of the skirt body 12 in a direction in which the skirt 411, 412 moves, the skirt body 12 having a ball delivery passage 14 and the lid 13 having a ball direction changing passage 15 interconnecting a loading ball passage 5 and a non-loading ball passage 8. The ball delivery passage 14 and the ball direction changing passage 15 jointly serve as the non-loading ball passage 8.

An elastic member 26 may be disposed on at least one of a lower surface of the base 23 and an upper surface of the moving base 25. The intermediate member 24 may comprise two upper and lower members, with an elastic member disposed between the two upper and lower members.

With the three-dimensional guiding apparatus according to the present invention, the curved guiding apparatuses 21, 22 are vertically stacked one over the other with the intermediate member 24 interposed therebetween and are located between the base 23 and the moving base 25. In each of the curved guiding apparatuses 21, 22, the bearing block 10 moves along the track rail 1 curved to a predetermined curvature. Therefore, as the bearing block 10 moves along the arcuate track of predetermined radius of curvature with respect to the track rail 1, the balls roll in the loading ball passage 5 composed of the ball rolling grooves 81, 82 in the track rail 1 and the ball rolling grooves 6 in the bearing block 10 while bearing the applied load, for smoothly guiding the bearing block 10 along the arcuate track.

The three-dimensional guiding apparatus can thus make three-dimensional motions which are a combination of two arcuate motions, and can bear large loads.

Specifically, the curved guiding apparatuses 21, 22 disposed between the moving base 25 and the intermediate member 24 and between the intermediate member 24 and the base 23 have their components installed as the rail attachment member 38 and the block attachment member 39. As shown in FIGS. 4A and 4B, the side 73 of the track rail 1 is attached to the vertical attachment surface 382 of the rail attachment member 38 (the intermediate member 24 shown in FIG. 4A), and the attachment surface 74 of the portion where no vertical loads are applied (the upper side surface 71 of the track rail shown in FIG. 4A), of the track rail 1 is attached to the horizontal attachment surface 381. Consequently, loads are borne not only by the side surface 73 of the track rail 1 and the vertical attachment surface 382, but also vertically by the horizontal attachment surface 381 of the rail attachment member 38, so that the track rail 1 can firmly be attached to the rail attachment member 38.

Similarly, the connecting portion 3 of the bearing block 10 is attached to the vertical attachment surface 392 of the block attachment member 39 (the base 23 shown in FIG. 4A), and the skirt 411 where vertical loads are not applied, of the bearing block 10 is held against the horizontal attachment surface 391. Therefore, loads are borne not only by the connecting portion 3 of the bearing block 10 and the vertical attachment surface 392 of the block attachment member 39, but also vertically by the bearing block 10 and the horizontal attachment surface 391 of the block attachment member 39, so that the bearing block 10 can firmly be attached to the block attachment member 39.

When the three-dimensional guiding apparatus is assembled, as shown in FIGS. 4A and 4B, since the horizontal attachment surface of the rail attachment member (the intermediate member 24 shown in FIG. 4A and the intermediate member 24 shown in FIG. 4B) to which the track rail is attached, and the horizontal. portion of the block attachment member (the base 23 shown in FIG. 4A and the moving base 25 shown in FIG. 4B) to which the bearing block is attached are arranged on a vertical line along which loads are applied, vertical loads between the rail attachment member and the block attachment member can directly be borne, resulting in a strong structure.

Inasmuch as vertical loads are distributed to and borne by the balls 9, no substantially large load is imposed on each of the balls. Thus, each of the balls 9 can sufficiently bear loads, and the three-dimensional guiding apparatus is capable of bearing large loads as a whole.

Furthermore, in the three-dimensional guiding apparatus incorporating a plurality of curved guiding apparatuses, since the three-dimensional guiding apparatus exists in a certain planar extent, it can stably installed. Because applied loads are distributed and borne, the three-dimensional guiding apparatus can bear larger loads.

As the contact angle θ of the balls is acute with respect to the direction in which loads are applied, applied vertical loads are appropriately divided into components in vertical and horizontal directions, and hence can effectively be borne. At the same time, the track rail and the bearing block are prevented from wobbling horizontally.

If the three-dimensional guiding apparatus employs elastic members, then vertical impulse loads applied vertically to the three-dimensional guiding apparatus are absorbed by the elastic members. Therefore, the three-dimensional guiding apparatus is capable of withstanding impulse loads. For example, even when vertical vibrations are applied as initial seismic vibrations to cause variations in the vertical load applied to the three-dimensional guiding apparatus, the elastic member dampens the load variations to thus prevent impulse loads from being applied to the three-dimensional guiding apparatus. As a result, the three-dimensional guiding apparatus is prevented from being damaged by initial vertical vibrations.

BRIEF DESCRIPTION OF DRAWINGS

FIGS. 4A and 4B are views showing the first embodiment of the three-dimensional guiding apparatus according to the present invention, FIG. 4A being a fragmentary sectional front elevational view and FIG. 4B a fragmentary sectional side elevational view as viewed in the direction indicated by the arrow X in FIG. 4A;

FIG. 13 is a view showing an example in which the three-dimensional guiding apparatus according to the present invention is used as a vibration isolating structure of a vibration-isolated building;

FIG. 19 is a cross-sectional view taken along line XIX—XIX of FIG. 17;

FIG. 21 is a cross-sectional view of a modification of the first (second) curved guiding apparatus of the third embodiment of the present invention;

FIG. 24 is a cross-sectional view of a second modification of the first (second) curved guiding apparatus of the third embodiment of the present invention;

BEST MODE FOR CARRYING OUT THE INVENTION

An arrangement of a three-dimensional guiding apparatus according to embodiments of the present invention will be described below.

[Curved guiding apparatus for use in three-dimensional guiding apparatus]

A curved guiding apparatus 21 (22) of a three-dimensional guiding apparatus 20 will first be described in detail below.

Figure 1:
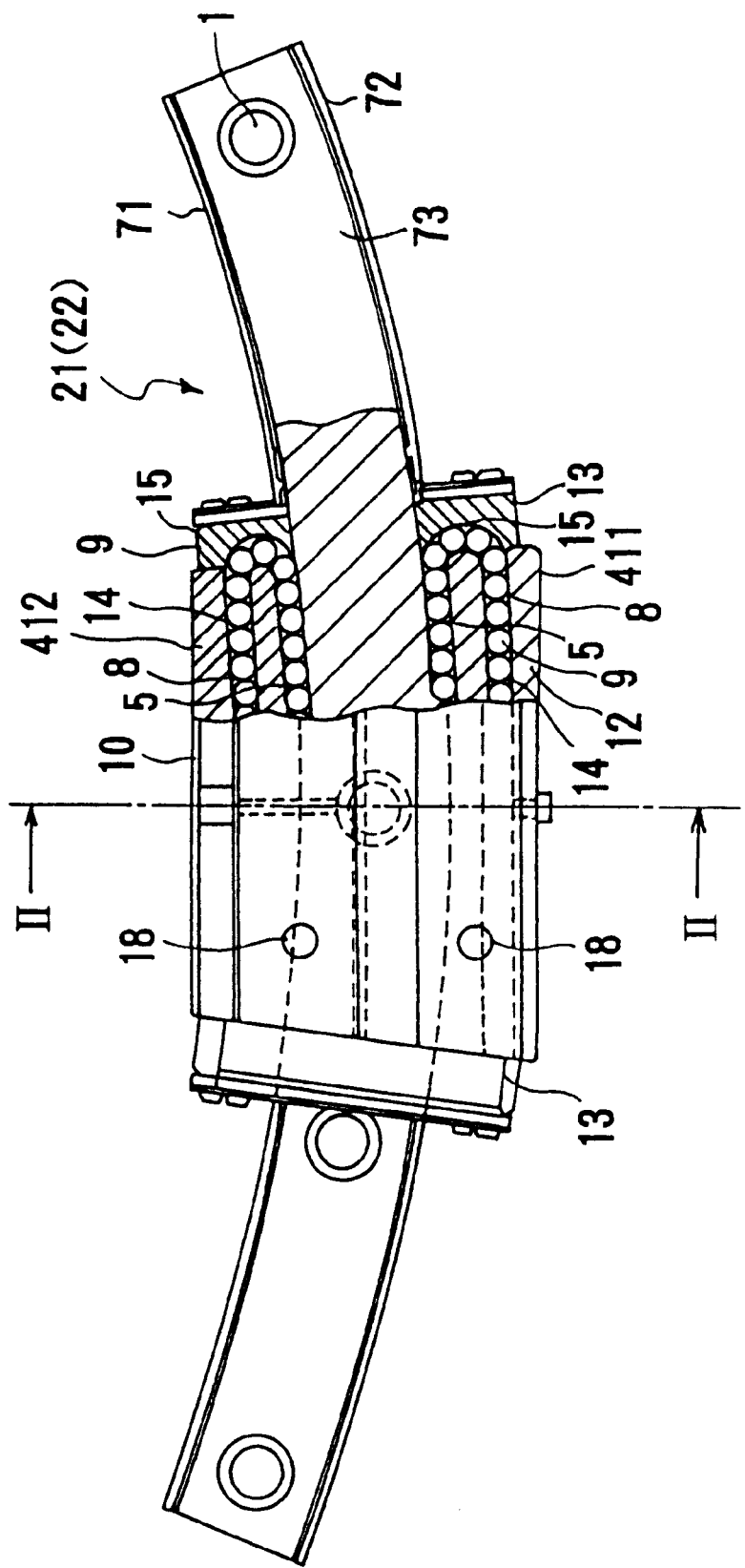
FIG. 1 is a fragmentary sectional plan view of a basic arrangement of a curved guiding apparatus for use as a three-dimensional guiding apparatus according to the present invention.
Figure 2:
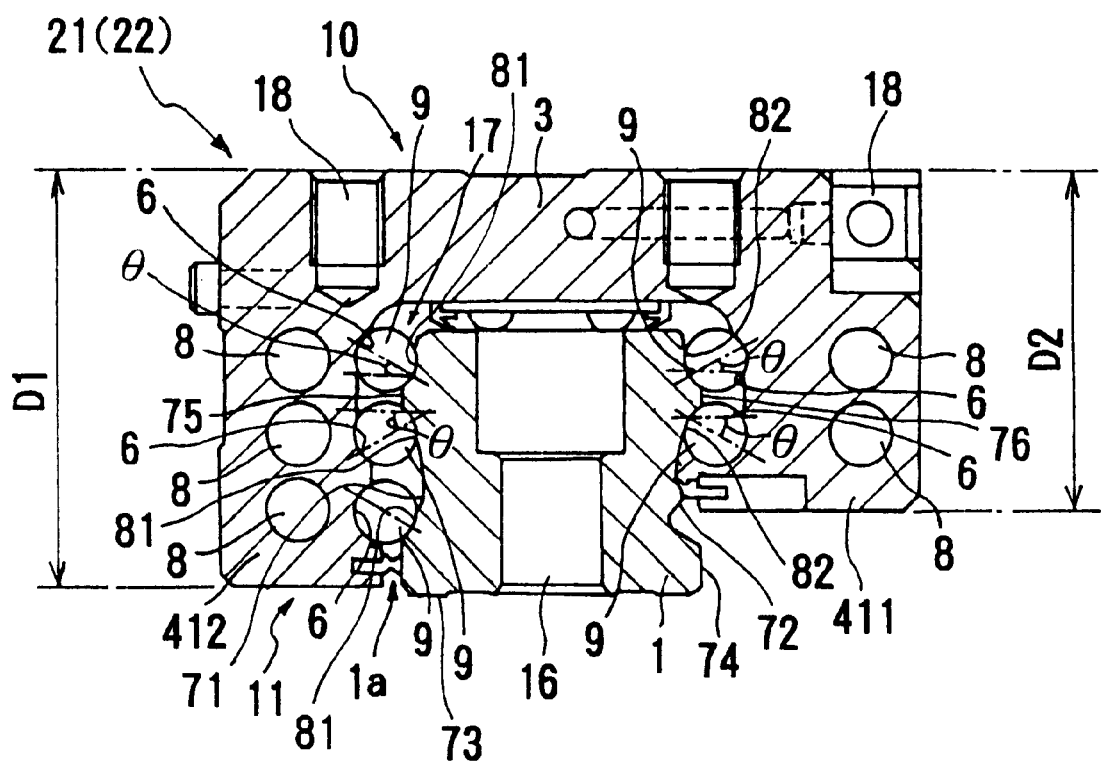
FIG. 2 is a cross-sectional view taken along line II—II of FIG. 1.

FIGS. 1 and 2 show the curved guiding apparatus 21 (22).

Each of the curved guiding apparatuses 21, 22 comprises a track rail 1 and a bearing block 10.

As shown in FIG. 1, the track rail 1 has a substantially rectangular cross-sectional shape and is curved in its longitudinal direction at a predetermined radius. As shown in FIG. 2, the track rail 1 has longitudinal ball rolling grooves 81, 82 defined in an upper side surface 71 near the center of curvature and a lower side surface 72 opposite to the upper side surface 71.

The ball rolling grooves 81 defined in the upper side surface 71 on which a load is applied allow three rows of balls to roll therein, and the ball rolling grooves 82 defined in the lower side surface 72 allow two rows of balls to roll therein.

As shown in FIG. 2, a ridge 75 is disposed between two of the three rolling grooves 81 defined in the upper side surface 71, with balls 9 held in contact with opposite sides of the ridge 75. A ridge 76 is disposed between the two rolling grooves 82 defined in the lower side surface 72, with balls 9 held in contact with opposite sides of the ridge 76.

The curved guiding apparatus 21 (22) is designed on the assumption that loads will act on the upper side surface 71, and has the three ball rolling grooves 81 in the upper side surface 71 and the two ball rolling grooves 82 in the lower side surface 72. In order to bear large loads, each of the track rail 1 and the bearing block 10 should preferably have at least four ball rolling grooves.

A curved guiding apparatus in which loads act on the lower side surface 72 may have three ball rolling grooves 82 in the lower side surface 72 and two ball rolling grooves 81 in the upper side surface 71.

The center of curvature of the ball rolling grooves 81, 82 is in conformity with the center of curvature of the track rail.

The reference numeral 16 represents a bolt hole for inserting a bolt to fasten the track rail 1 to a base or the like.

As shown in FIG. 2, the bearing block 10 fitted over the track rail 1 is of a substantially C-shaped cross section including a connecting portion 3 and two upper and lower skirts 411, 412 extending vertically from opposite ends of the connecting portion 3 and confronting the upper side surface 71 and the lower side surface 72 of the track rail 1. The connecting portion 3 and the upper and lower skirts 411, 412 jointly define a recess 17 which accommodates the track rail 1 therein. In this example, the skirt 412 on which a vertical load is applied has a dimension D1 in the direction in which the loading balls are juxtaposed, the dimension D1 being larger than a dimension D2 of the skirt 411 on which no vertical load is applied, thereby exposing an end portion of the lower side surface 72 of the track rail where no vertical load is applied, as a horizontal attachment surface 74.

As show in FIG. 2, the skirts 411, 412 have ball rolling grooves 6 defined in inner surfaces thereof. The ball rolling grooves 6 and the ball rolling grooves 81, 82 of the track rail 1 jointly form loading ball passages 5. The skirts 411, 412 also have non-loading ball passages 8 which cooperate with the loading ball passages 5 in defining ball circulating paths 7.

As shown in FIG. 1, the skirts 411, 412 are constructed of a skirt body 12 and lids 13 mounted on ends of the skirts 411, 412 with respect to the directions in which they move. Ball delivery passages 14 are defined in the skirt body 12, and the lids 13 have ball direction changing passages 15 which provide communication between the loading ball passages 5 and the ball delivery passages 14.

As shown in FIG. 1, the ball direction changing passages 15 serve as passages in which the balls 9 move in reversed directions along arcuate paths, and are semiannular in shape.

The ball delivery passages 14 and the ball direction changing passages 15 jointly serve as the non-loading ball passages 8.

A number of balls 9 are filled in the ball circulating paths 7, and balls 9 are disposed in the loading ball passages. The balls 9 roll while distributing and bearing loads applied to the bearing block 10 or the track rail 1, for guiding the bearing block 10 along the track rail 1.

In this example, the ball rolling grooves 81, 82, 6 of the loading ball passages 5 have a cross-sectional shape including an arcuate surface which has a radius of curvature that is slightly greater than the radius of the ball 9. The balls 9 are held in point-to-point contact with the ball rolling grooves 81, 82, 6. As shown in FIG. 2, each of the balls 9 as it rolls is held in contact with these grooves at two opposite points. Two balls disposed one on each side of the ridge of the track rail are held in contact with the ball rolling grooves at an outwardly open contact angle θ which is an acute angle of about 30 degrees. The balls held in contact with the ball rolling grooves at this contact angle divide an applied vertical load to be divided in vertical and horizontal directions for effectively bearing the load and also preventing the track rail and the bearing block from wobbling laterally.

In this example, as the bearing block 10 moves, the ball 9 which has reached an end of each of the loading ball passages 5 circulates through the non-loading ball passage 8 composed of the ball direction changing passage 15 and the ball delivery passage 14 back to an opposite end of the loading ball passage 5, and also freely reciprocates between the loading ball passage 5 and the non-loading ball passage 8 for thereby guiding the bearing block 10.

The reference numeral 18 represents bolt holes for fastening a member to the bearing block 10.

In the curved guiding apparatus 21 (22), only rolling friction of the balls 9 occurs between the bearing block 10 and the track rail 1, so that the bearing block 10 can smoothly move along the track rail 1. At this time, since the load is distributed to and borne by the many balls, a large load is not exerted to each of the balls. Therefore, each ball 9 can sufficiently withstand the load, so that the curved guiding apparatus can bear large loads.

Inasmuch as the balls 9 sandwich the ridges 75, 76 of the track rail 1 in the loading ball passages, the track rail 1 and the bearing block 10 are reliably prevented from making vertical relative movement or horizontal relative movement except in directions in which they move while being guided by the balls 9. The moving base can cope with rotational forces, and the bearing block 10 can smoothly move only along a desired arcuate track while being prevented from wobbling or vibrating.

[1st Embodiment]

A three-dimensional guiding apparatus according to a first embodiment of the present invention will be described below.

Figure 3:
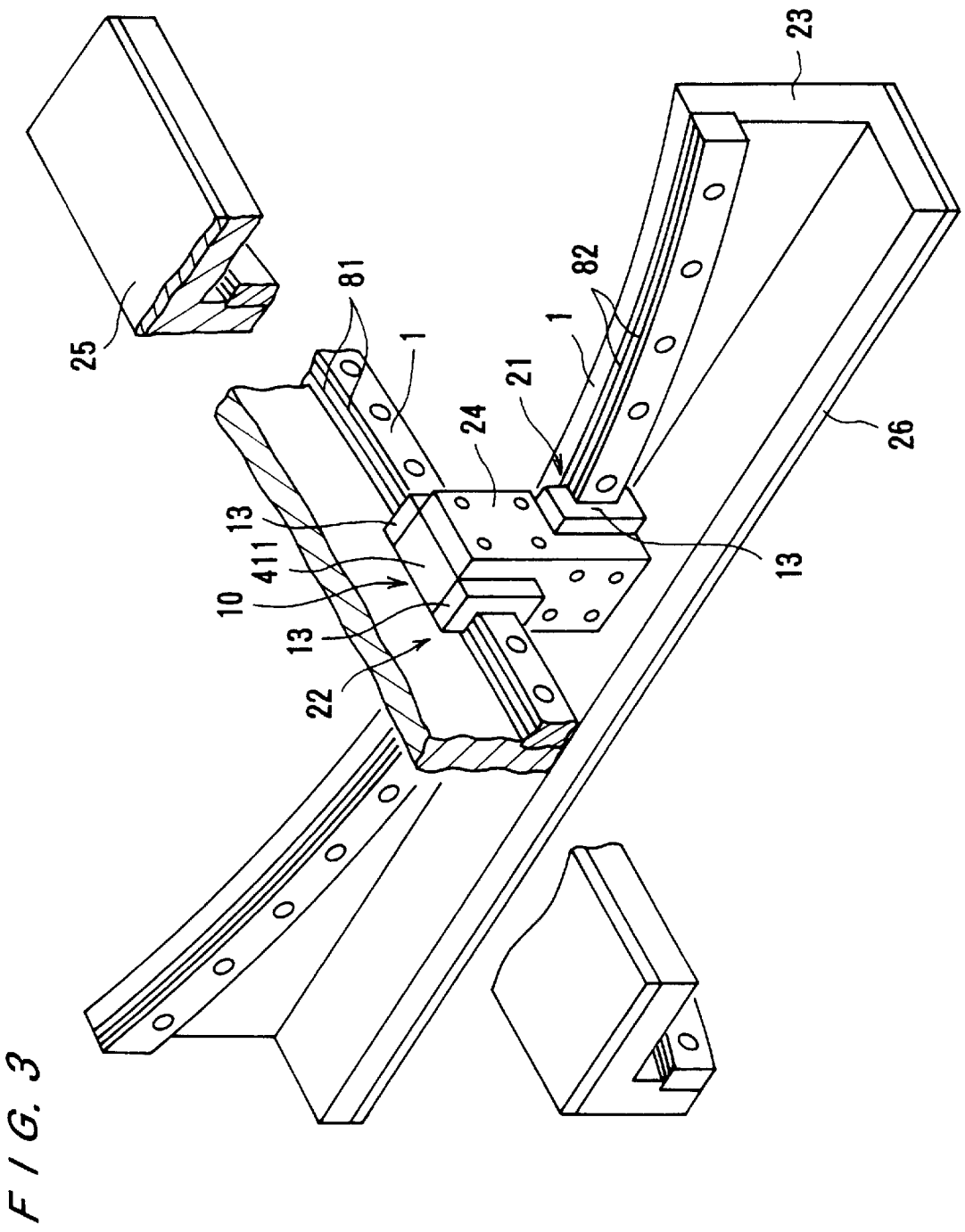
FIG. 3 is a perspective view of a first embodiment of the three-dimensional guiding apparatus according to the present invention.

As shown in FIGS. 3 and 4, a three-dimensional guiding apparatus 20 comprises a base 23, an intermediate member 24 mounted on an upper side of the base 23 by a lower curved guiding apparatus 21 movable along a downwardly convex track, and a moving base 25 mounted on an upper side of the intermediate member 24 by an upper curved guiding apparatus 22 movable along a downwardly convex track and having a plane of movement crossing the plane of movement of the curved guiding apparatus 21.

In this example, the curved guiding apparatus 21 and the curved guiding apparatus 22 are identical in structure to those described above.

The base 23 comprises a horizontal portion 231 and a vertical portion 232 and has a substantially L-shaped cross section. The base 23 serves as a block attachment member 39 for the lower curved guiding apparatus 21.

The intermediate member 24 comprises two vertical attachment plate members 241, 242 crossing perpendicularly to each other and connected as lower and upper members to each other. The intermediate member 24 serves as a rail attachment member 38 for the lower curved guiding apparatus 21, and a rail attachment member 38 for the upper curved guiding apparatus 22.

The moving base 25 comprises a horizontal portion 251 and a vertical portion 252 and has a substantially L-shaped cross section. The moving base 25 serves as a block attachment member 39 for the upper curved guiding apparatus 22.

The relationship in which the base 23, the lower curved guiding apparatus 21, and the intermediate member 24 are attached will be described below with reference to FIGS. 4A and 4B.

In the lower curved guiding apparatus 21, the lower vertical attachment plate member 241 of the intermediate member 24 as the rail attachment member 39 is connected to the track rail 1, and the base 23 as the block attachment member 39 is connected to the bearing block 10.

A vertical load is mainly applied to the lower side surface 72 of the track rail 1 and the lower skirt 412 of the bearing block 10.

In this example, an upper surface of the horizontal portion 231 of the base 23 serves as a horizontal attachment surface 391, and an inner surface of the vertical potion 232 serves as a vertical attachment surface 392. The lower skirt 412 is held against the horizontal attachment surface 391, and the connecting portion 3 of the bearing block is attached to the vertical attachment surface 392.

In this example, a recess of rectangular cross section is defined in the lower vertical attachment plate member 241 of the intermediate member 24, providing a vertical attachment surface 382 and a horizontal attachment surface 381 extending horizontally from an upper edge of the vertical attachment surface 382. The horizontal attachment surface 74 of the upper surface 71 of the track rail 1 is held against the horizontal attachment surface 381, and a side surface 73 of the track rail is attached to the vertical attachment surface 382.

The horizontal portion 231 of the base 23 is attached to a foundation 60 by an elastic member 26 of hard synthetic resin or the like.

The relationship in which the intermediate member 24, the upper curved guiding apparatus 22, and the moving base 25 are attached will be described below with reference to FIG. 4B. This attached relationship is a vertical reversal of the relationship in which the base 23, the lower curved guiding apparatus 21, and the intermediate member 24 are attached In the upper curved guiding apparatus 22, the upper vertical attachment plate member 242 of the intermediate member 24 as the rail attachment member 39 is connected to the track rail 1, and the moving base 25 as the block attachment member 39 is connected to the bearing block 10.

A vertical load is mainly applied to the upper side surface 71 of the track rail 1 and the upper skirt 412 of the bearing block 10. Therefore, the upper side surface 71 of the track rail 1 has three ball rolling surfaces, and the lower side surface 72 has two ball rolling surfaces.

A lower surface of the horizontal portion 251 of the moving base 25 serves as a horizontal attachment surface 391, and an inner surface of the vertical potion 252 serves as a vertical attachment surface 392. The upper skirt 412 is held against the horizontal attachment surface 391, and the connecting portion 3 of the bearing block is attached to the vertical attachment surface 392. A recess of rectangular cross section is defined in the upper vertical attachment plate member 242 of the intermediate member 24, providing a vertical attachment surface 382 and a horizontal attachment surface 381 extending horizontally from a lower edge of the vertical attachment surface 382. The horizontal attachment surface 74 of the lower surface 72 of the track rail 1 is held against the horizontal attachment surface 381, and the side surface 73 of the track rail is attached to the vertical attachment surface 382. The horizontal portion 251 of the moving base 25 is attached to a building 61 by an elastic member 26 of hard synthetic resin or the like.

Through this structure, the lower curved guiding apparatus 21 and the upper curved guiding apparatus 22 are coupled in perpendicularly crossing relation by the intermediate member 24.

In this example, the radii of curvature of the track rails 1 are selected such that the center of curvature of the track rail 1 of the curved guiding apparatus 21 and the center of curvature of the track rail 1 of the curved guiding apparatus 22 are aligned with each other. Therefore, the three-dimensional guiding apparatus according to this embodiment makes its guiding movement along a downwardly convex spherical surface.

Since the three-dimensional guiding apparatus comprises two upper and lower curved guiding apparatuses, the moving base 25 can make three-dimensional motions which are a combination of two arcuate motions with respect to the base 23.

In the three-dimensional guiding apparatus according to this embodiment, the base 23, the curved guiding apparatus 21, the intermediate member 24, and the curved guiding apparatus 22 are combined in the above structure. Consequently, loads are borne not only by the side surface 73 of the track rail 1 and the vertical attachment surface 382, but also vertically by the horizontal attachment surface 381 of the rail attachment member 38, so that the track rail 1 can firmly be attached to the rail attachment member 38. Furthermore, loads are borne not only by the connecting portion 3 of the bearing block 10 and the vertical attachment surface 392 of the block attachment member 39, but also vertically by the bearing block 10 and the horizontal attachment surface 391 of the block attachment member 39, so that the bearing block 10 can firmly be attached to the block attachment member 39.

Since the horizontal attachment surface of the rail attachment member and the horizontal portion of the block attachment member are arranged on a vertical line along which loads are applied, vertical loads between the rail attachment member and the block attachment member can directly be borne, resulting in a strong structure.

Inasmuch as the elastic members 26 are disposed below the base 23 and above the moving base 25 of the three-dimensional guiding apparatus, vertical impulse loads acting on the three-dimensional guiding apparatus are absorbed by the elastic members 26, and hence the three-dimensional guiding apparatus can withstand impulse loads.

Examples in which the three-dimensional guiding apparatus according to the above embodiment is used will be described below.

In a first example, as shown in FIG. 13, a plurality of three-dimensional guiding apparatuses are disposed between a building 301 and a foundation 302 and their guiding radii and attached positions are adjusted such that the centers of arcs serving as guiding tracks of the respective three-dimensional guiding apparatus are positioned at a single point O.

In this case, the building 301 will oscillate on a spherical plane whose center is at the point O when subjected to seismic vibrations.

Figure 14:
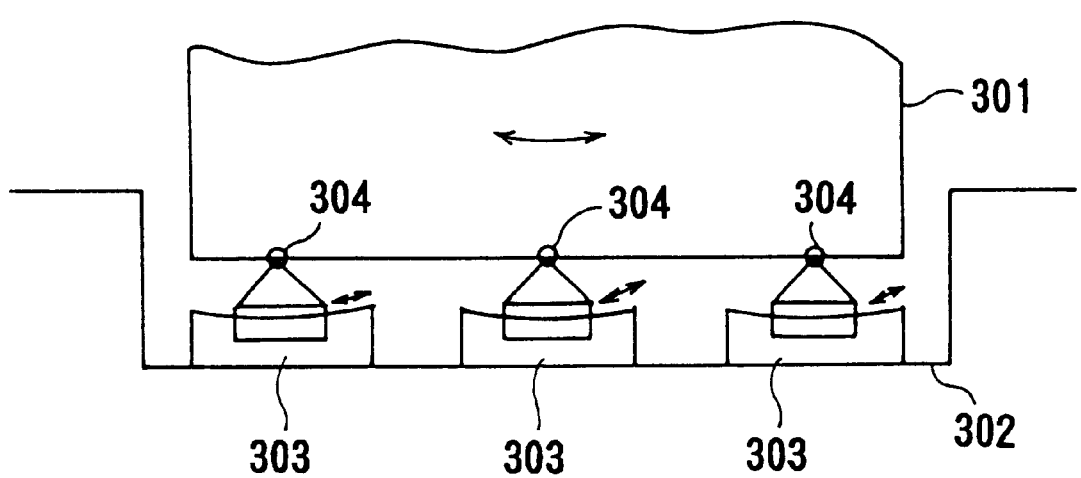
FIG. 14 is a view showing another example in which the three-dimensional guiding apparatus according to the present invention is used as a vibration isolating structure of a vibration-isolated building.

In a second example, as shown in FIG. 14, a plurality of three-dimensional guiding apparatuses 303 are attached to a building 301 such that the centers of arcs serving as guiding tracks of the respective three-dimensional guiding apparatus are not positioned at a single point O. In this case, it is necessary to provide rocking mechanisms 304 between the building 301 and the three-dimensional guiding apparatuses 303 for allowing tilts to be generated between the building 301 and the three-dimensional guiding apparatus 303 when vibrated. Each of the rocking mechanisms 304 may comprise a hinge device such as a spherical coupling or an elastic member of rubber or the like.

[Modification of 1st Embodiment]

Figure 5A:
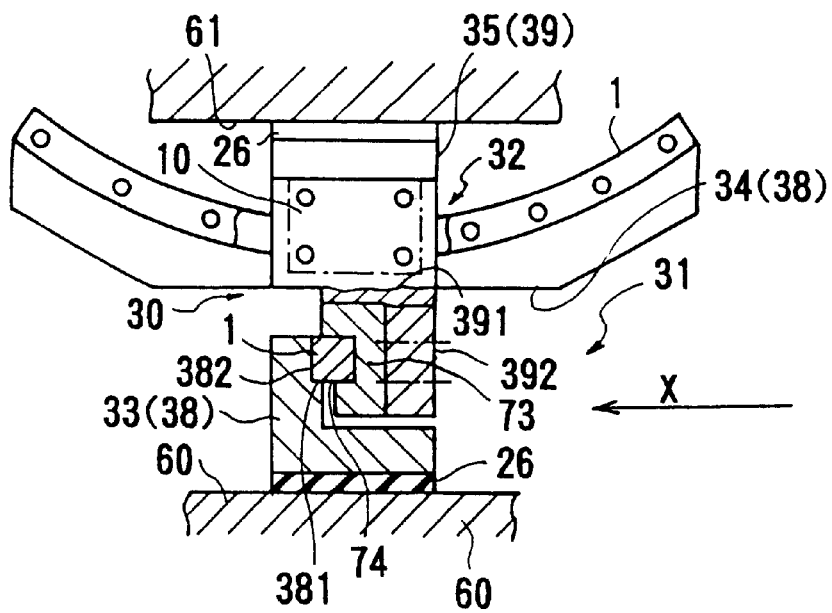
FIGS. 5A and 5B are views showing a first modification of the first embodiment of the three-dimensional guiding apparatus according to the present invention, FIG. 5A being a fragmentary sectional front elevational view and FIG. 5B a fragmentary sectional side elevational view as viewed in the direction indicated by the arrow X in FIG. 5A.
Figure 5B:
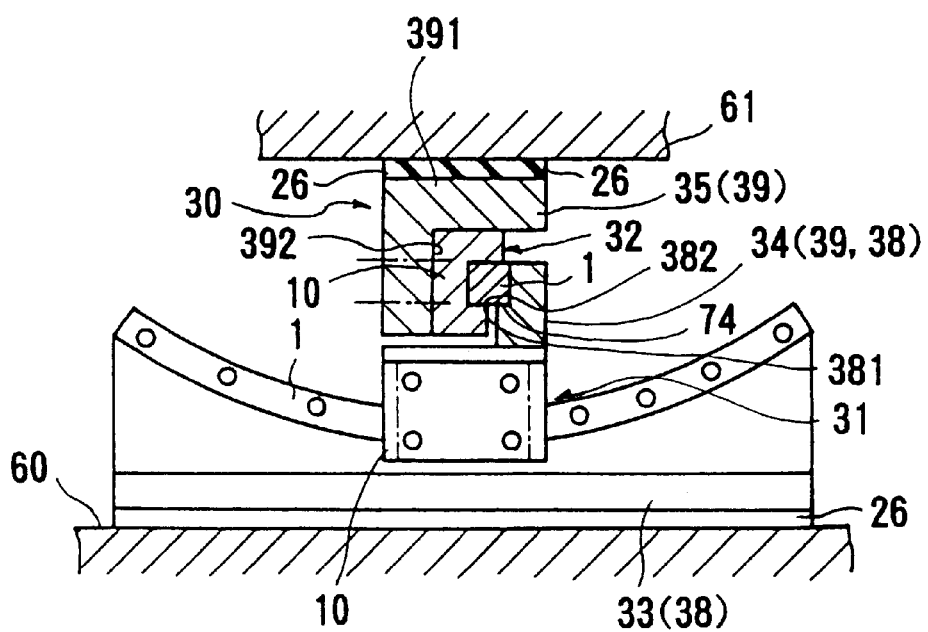

FIGS. 5A and 5B schematically show a first modification of the first embodiment of the three-dimensional guiding apparatus according to the present invention. A three-dimensional guiding apparatus 30 according to the first modification differs from the three-dimensional guiding apparatus 20 according to the first embodiment in that a track rail 1 of a curved guiding apparatus 31 is attached to a base 33 fixed to a foundation 60 in a lower portion of the three-dimensional guiding apparatus 30, and a bearing block 10 of the curved guiding apparatus 31 is connected to a track rail 1 of an upper curved guiding apparatus 32 by an intermediate member 34.

In this example, therefore, the base 33 serves as a rail attachment member 38 for the lower curved guiding apparatus 31, the intermediate member 34 serves as a block attachment member 39 for the lower curved guiding apparatus 31 and as a rail attachment member 38 for the upper curved guiding apparatus 32, and a moving base 35 serves as a block attachment member 39 for the upper curved guiding apparatus 32.

Other basic structural details are identical to those of the three-dimensional guiding apparatus shown in FIG. 2, and structural details of the curved guiding apparatuses 31, 32 are identical to the above curved guiding apparatus.

Figure 6A:
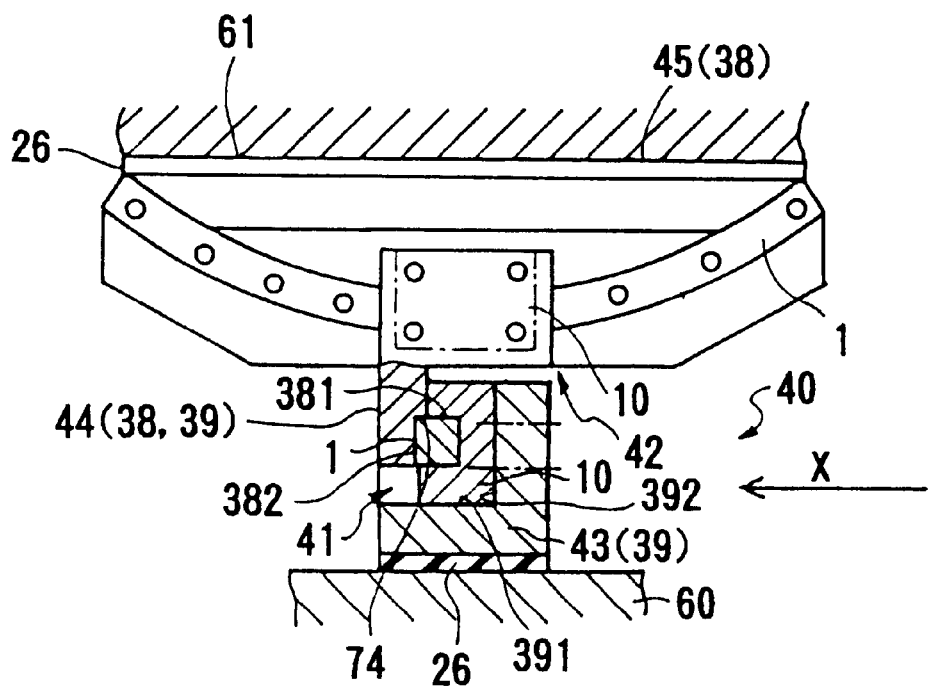
FIGS. 6A and 6B are views showing a second modification of the first embodiment of the three-dimensional guiding apparatus according to the present invention, FIG. 6A being a fragmentary sectional front elevational view and FIG. 6B a fragmentary sectional side elevational view as viewed in the direction indicated by the arrow X in FIG. 6A.
Figure 6B:
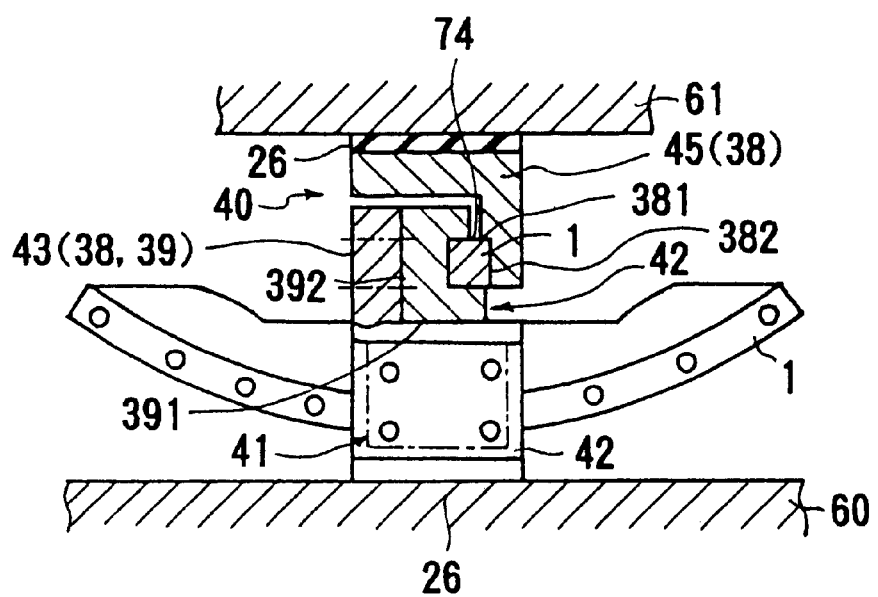

FIGS. 6A and 6B schematically show a second modification of the first embodiment of the three-dimensional guiding apparatus according to the present invention.

A three-dimensional guiding apparatus 40 according to the second modification differs from the three-dimensional guiding apparatus 20 according to the first embodiment in that a track rail 1 of a curved guiding apparatus 42 is attached to a moving base 45 fixed to a building 61 in an upper portion of the three-dimensional guiding apparatus 40, and a bearing block 10 of the curved guiding apparatus 42 is connected to a track rail 1 of a lower curved guiding apparatus 41 by an intermediate member 44.

In this example, therefore, a base 43 serves as a block attachment member 39 for the lower curved guiding apparatus 41, the intermediate member 44 serves as a rail attachment member 38 for the lower curved guiding apparatus 41 and as a block attachment member 39 for the upper curved guiding apparatus 42, and the moving base 45 serves as a rail attachment member 38 for the upper curved guiding apparatus 42.

Other basic structural details are identical to those of the three-dimensional guiding apparatus shown in FIG. 1, and structural details of the curved guiding apparatuses 41, 42 are identical to the above curved guiding apparatus.

Figure 7A:
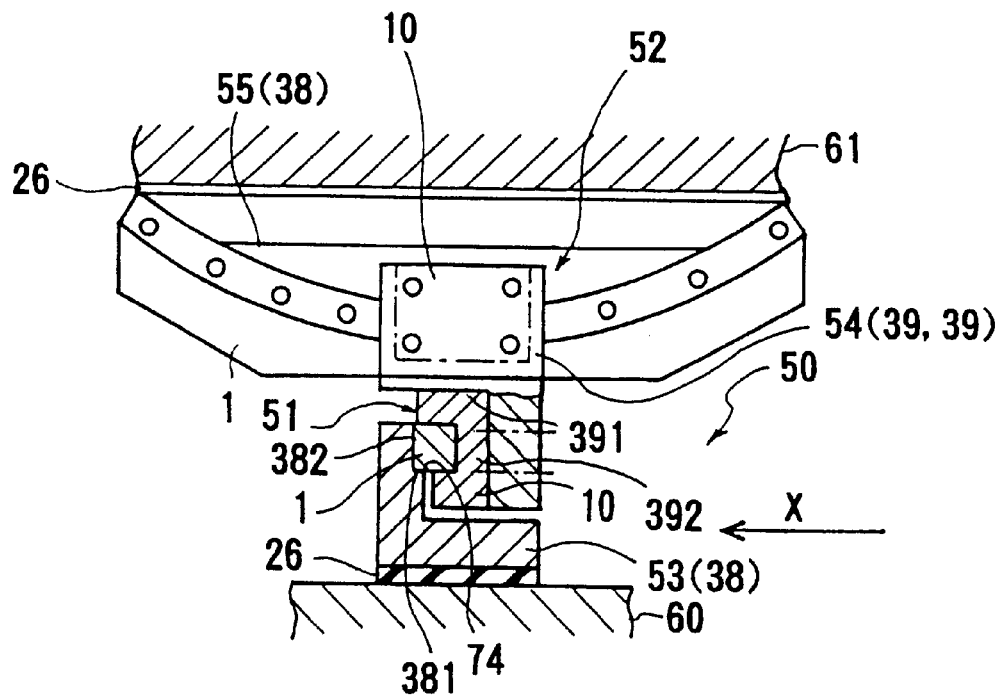
FIGS. 7A and 7B are views showing a third modification of the first embodiment of the three-dimensional guiding apparatus according to the present invention, FIG. 7A being a fragmentary sectional front elevational view and FIG. 7B a fragmentary sectional side elevational view as viewed in the direction indicated by the arrow X in FIG. 7A.
Figure 7B:
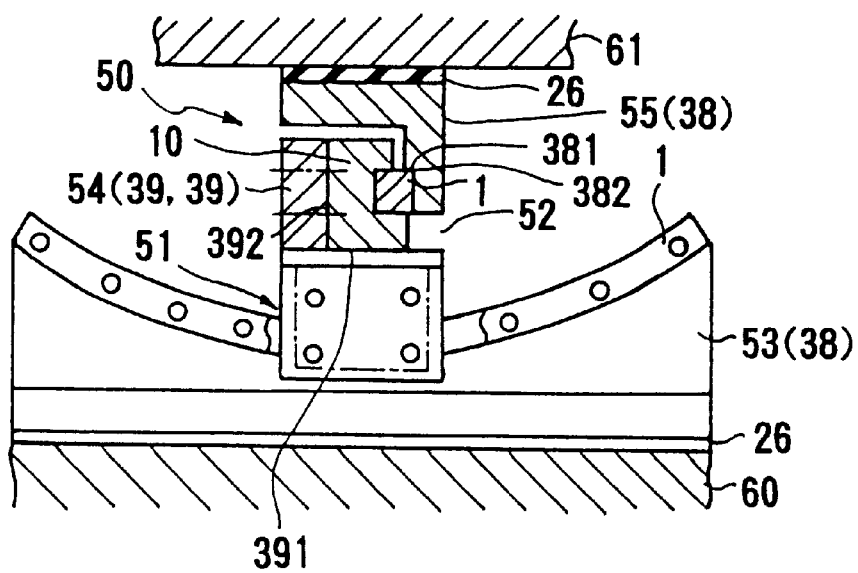

FIGS. 7A and 7B schematically show a third modification of the first embodiment of the three-dimensional guiding apparatus according to the present invention.

A three-dimensional guiding apparatus 50 according to the third modification differs from the three-dimensional guiding apparatus 20 according to the first embodiment in that a track rail 1 of a curved guiding apparatus 51 is attached to a base 53 fixed to a foundation 60 in a lower portion of the three-dimensional guiding apparatus 50, and a bearing block 10 of the lower curved guiding apparatus 51 and a bearing block 10 of an upper curved guiding apparatus 52 are fixed to intermediate member 54, and a track rail 1 of the upper curved guiding apparatus 52 is attached to a moving base 55 fixed to a building 61.

In this example, therefore, the base 53 serves as a rail attachment member 38 for the lower curved guiding apparatus 51, the intermediate member 54 serves as a block attachment member 39 for the lower curved guiding apparatus 51 and as a block attachment member 39 for the upper curved guiding apparatus 52, and the moving base 55 serves as a rail attachment member 38 for the upper curved guiding apparatus 52.

Other basic structural details are identical to those of the three-dimensional guiding apparatus shown in FIG. 1, and structural details of the curved guiding apparatuses 51, 52 are identical to the above curved guiding apparatus.

In each of the above modifications, as with the above embodiment of the three-dimensional guiding apparatus, the elastic members 26 are attached to the base and the moving base, and the three-dimensional guiding apparatus may be disposed between the foundation 60 and the building 61, thus providing a vibration isolating structure for the building.

In each of above examples, one bearing block 10 is provided for each track rail. However, a plurality of bearing blocks may be provided for each track rail 1, and may be coupled to each other.

[2nd Embodiment]

A three-dimensional guiding apparatus according to a second embodiment of the present invention will be described below.

The three-dimensional guiding apparatus according to the second embodiment differs from the three-dimensional guiding apparatus according to the first embodiment in that two curved guiding apparatuses are disposed between the base and the intermediate member and two curved guiding apparatuses are disposed between the intermediate member and the moving base, with each curved guiding apparatus having two bearing blocks, and the base, the intermediate member, and the moving base are different in structure. Structural details of the track rail 1 and the bearing block 10 are identical to those shown in FIGS. 1 and 2.

Figure 8A:
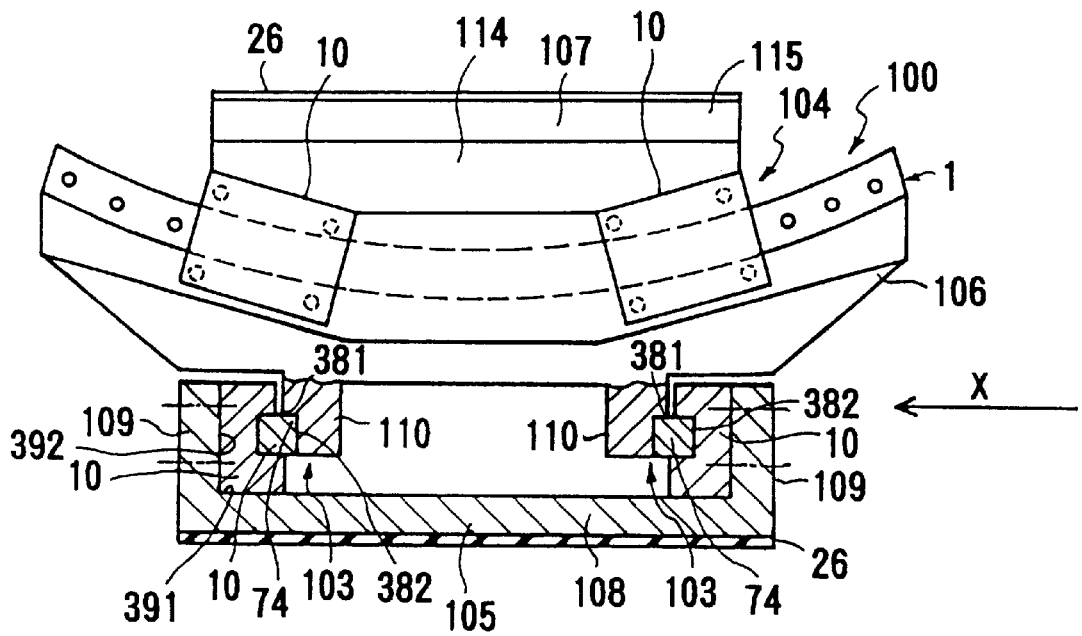
FIGS. 8A and 8B are views showing a second embodiment of the three-dimensional guiding apparatus according to the present invention, FIG. 8A being a fragmentary sectional front elevational view and FIG. 8B a fragmentary sectional side elevational view as viewed in the direction indicated by the arrow X in FIG. 8A.
Figure 8B:
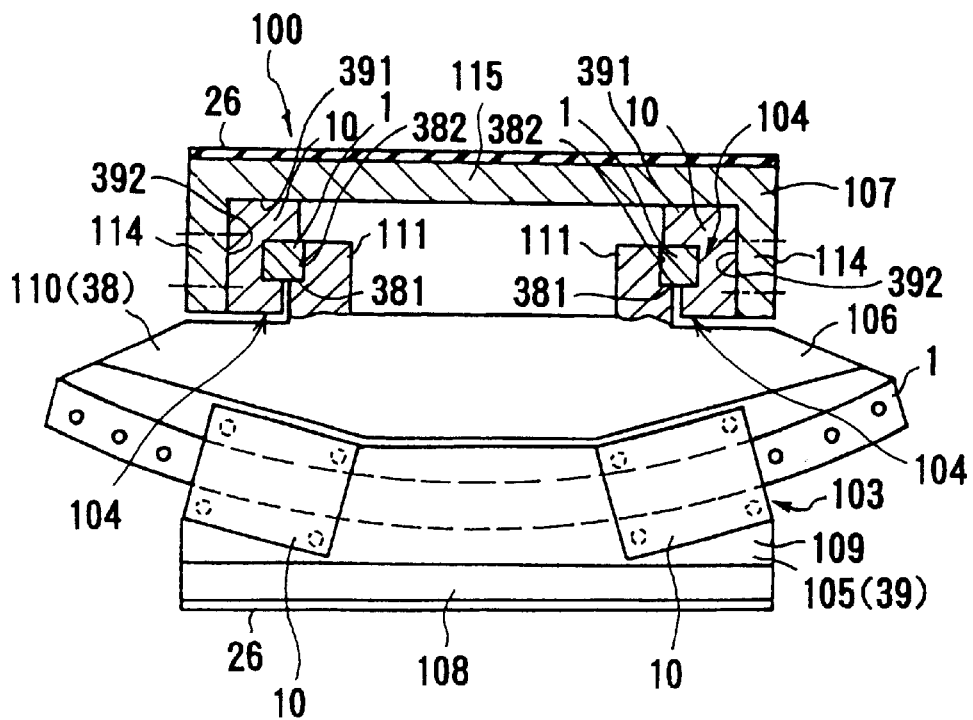

In the second embodiment, as shown in FIGS. 8A and 8B, a three-dimensional guiding apparatus 100 comprises two curved guiding apparatuses 103 mounted on a base 105, two curved guiding apparatuses 104 mounted on the curved guiding apparatuses 103 by an intermediate member 106, and a moving base 107 mounted on the curved guiding apparatuses 104.

In this example, the base 105 is of a substantially channel-shaped cross sectional shape and comprises a flat plate 108 and vertical members 109 erected on respective opposite ends of the flat plate 108 parallel to each other. The base 105 serves as a block attachment member 39. Two bearing blocks 10 are mounted at a given spaced interval on each of the vertical members 109 and are angularly positioned such that one track rail 1 can be fitted in the bearing blocks 10. A spacer is mounted on the flat plate 108, and has a horizontal portion 391 against which lower skirts 412 of the bearing blocks 10 are held. The bearing blocks 10 are attached to vertical attachment surfaces 392 as inner surfaces of the vertical members 109. Loads from the bearing blocks 10 are transmitted directly to the flat plate 108.

Two track rails 1 fitted in the bearing blocks 10 are connected to the intermediate member 106.

The intermediate member 106 comprises two parallel lower vertical plates 110 and two upper vertical plates 111 mounted thereon in a pattern of parallel crosses. Two track rails 1 are attached to the lower vertical plates 110 which serve as rail attachment members of the lower curved guiding apparatus, and two track rails 1 of the upper curved guiding apparatus 104 are attached to the upper vertical plates 111 which serve as rail attachment members of the upper curved guiding apparatus 104.

The two lower vertical plates 110 have vertical attachment surfaces 382 and horizontal attachment surfaces 381, as with the lower vertical member of the intermediate member according to the first embodiment, and exposed portions of the lower side surfaces 72 of the track rails 1 are joined to the horizontal attachment surfaces 381, whereas the side surfaces 73 thereof are attached to the vertical plates 110.

Similarly, the two upper vertical plates 111 have vertical attachment surfaces 382 and horizontal attachment surfaces 381, and exposed portions of the lower side surfaces 72 of the track rails 1 of the upper curved guiding apparatus 104 are joined to the horizontal attachment surfaces 381, whereas the side surfaces 73 thereof are attached to the vertical attachment surfaces 382.

The two pairs of the bearing blocks 10 mounted on the moving base 107 are fitted over a track rail assembly 101.

The moving base 107 comprises a flat plate 115 mounted on two parallel vertical members 114. Two bearing blocks 10 are mounted at a given spaced interval on each of the vertical members 114 and are angularly positioned such that one track rail 1 can be fitted in the bearing blocks 10. Thus, the structure of the moving base 107 is equivalent to the structure of the base 105 as it is vertically inverted and horizontally angularly displaced 90 degrees.

The reference numeral 26 represents elastic members disposed on the flat plates 108, 115 of the base 105 and the moving base 107.

In this example, the radii of curvature of the track rails 1 are selected such that the center of curvature of the track rails 1 of the curved guiding apparatus 103 and the center of curvature of the track rails 1 of the curved guiding apparatus 104 are aligned with each other. Therefore, the moving base 107 is guided along a downwardly convex spherical surface with respect to the base 105.

In this embodiment, the motions described above with respect to the first embodiment are produced between the base 105 and the intermediate member 106 and also between the intermediate member 106 and the moving base 107. Consequently, the three-dimensional guiding apparatus can be used under high loads and can operate smoothly, with the elastic members being capable of absorbing vertical vibrations.

Furthermore, since the three-dimensional guiding apparatus 100 exists in a certain planar extent, it can stably installed. Because the three-dimensional guiding apparatus comprises two curved guiding apparatuses, applied loads are distributed and borne by the two curved guiding apparatuses. Consequently, the three-dimensional guiding apparatus can bear larger loads and lends itself to being used in a vibration isolating structure for buildings.

[Modifications of 2nd Embodiment]

Figure 9A:
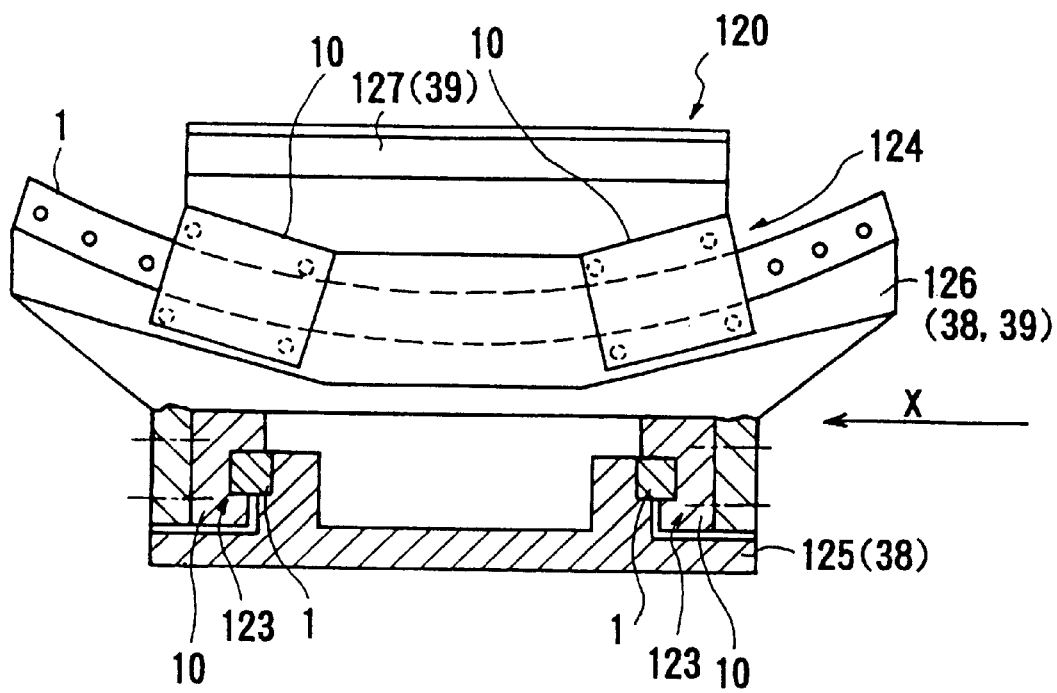
FIGS. 9A and 9B are views showing a first modification of the second embodiment of the three-dimensional guiding apparatus according to the present invention, FIG. 9A being a fragmentary sectional front elevational view and FIG. 9B a fragmentary sectional side elevational view as viewed in the direction indicated by the arrow X in FIG. 9A.
Figure 9B:
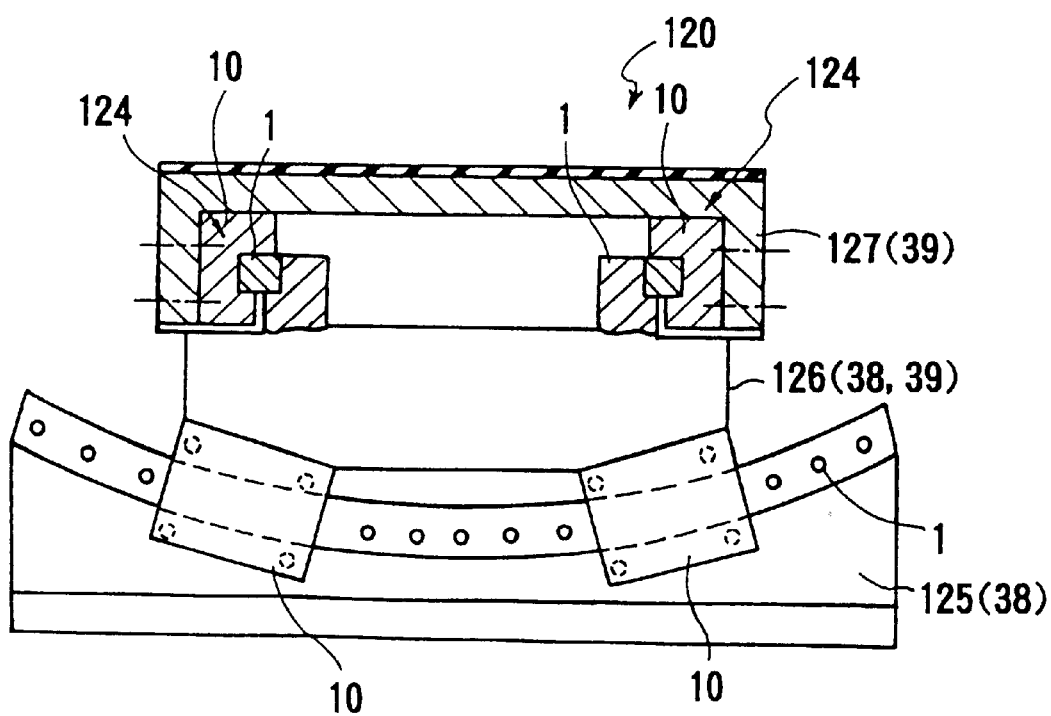

FIGS. 9A and 9B schematically show a first modification of the second embodiment.

In a three-dimensional guiding apparatus 120 according to the first modification, a base 125 serves as a rail attachment member 38, and track rails 1 of two curved guiding apparatuses 123 are attached to the base 125 which is fixed to a foundation. An intermediate member 126 serves as a block attachment member 39 for two lower curved guiding apparatuses 123. Four bearing blocks 10 of the two curved guiding apparatuses 123 are attached to the intermediate member 126. The intermediate member 126 also serves as a rail attachment member 38 for two upper curved guiding apparatuses 124, and two rails 1 are connected to the intermediate member 126.

A moving base 127 serves as a block attachment member 39 for the two upper curved guiding apparatuses 124, and two bearing blocks 10 of each of the curved guiding apparatuses 124 are attached to the moving base 127.

Figure 10A:
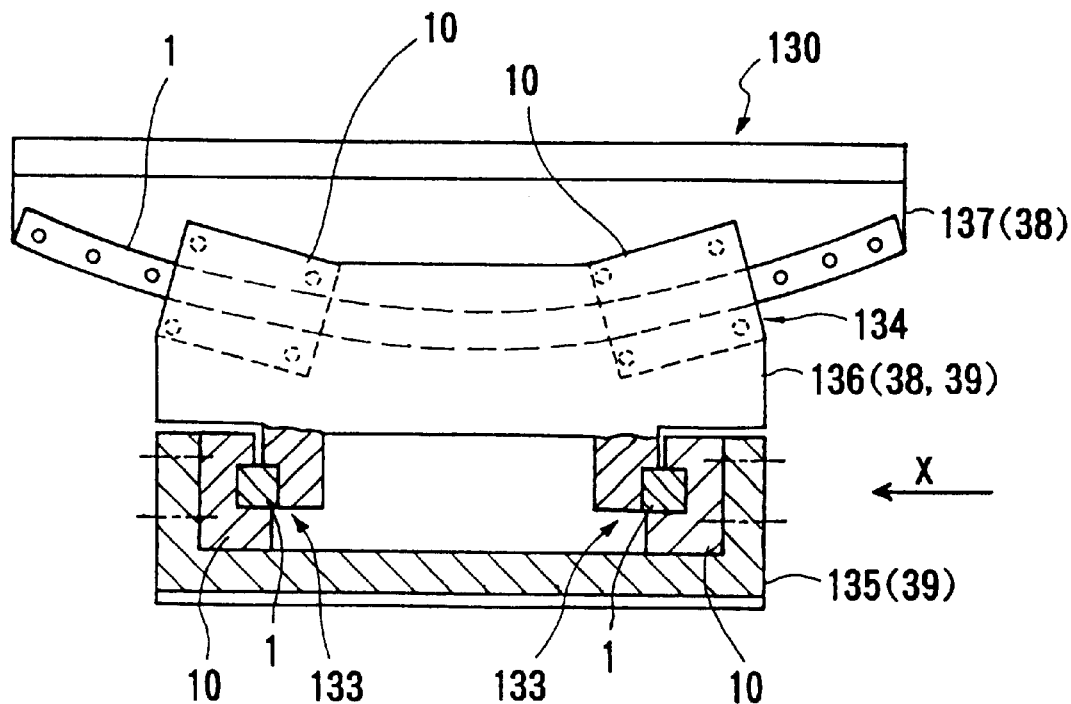
FIGS. 10A and 10B are views showing a second modification of the second embodiment of the three-dimensional guiding apparatus according to the present invention, FIG. 10A being a fragmentary sectional front elevational view and FIG. 10B a fragmentary sectional side elevational view as viewed in the direction indicated by the arrow X in FIG. 10A.
Figure 10B:
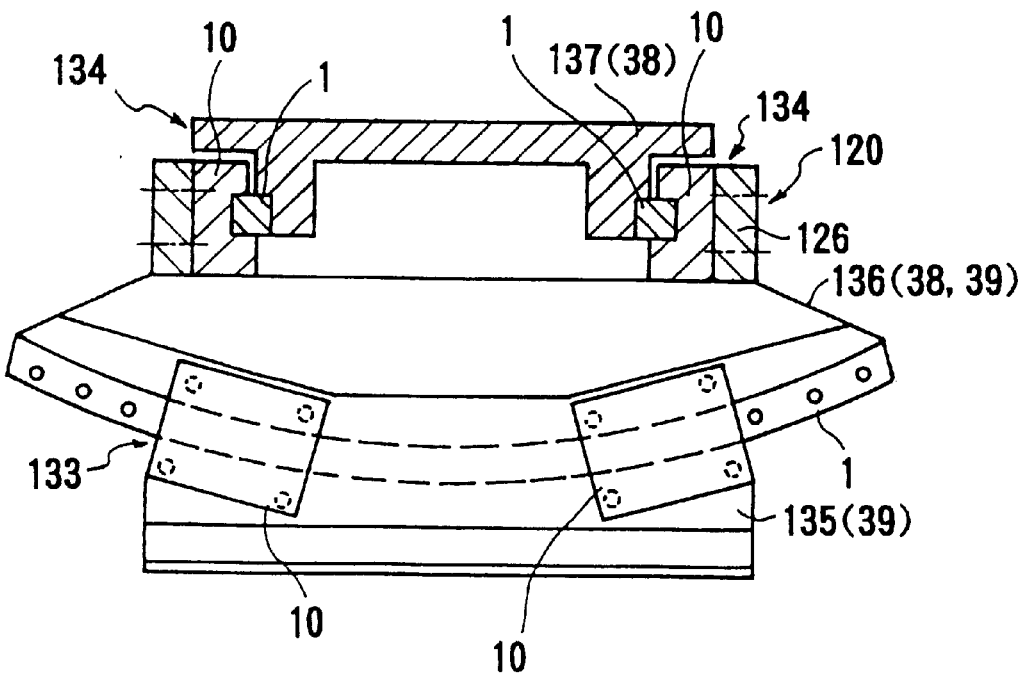

FIGS. 10A and 10B schematically show a second modification of the second embodiment.

In a three-dimensional guiding apparatus 130 according to the second modification, a base 135 serves as a block attachment member 39, and four bearing blocks 10 of two lower curved guiding apparatuses 133 are attached to the base 135 which is fixed to a foundation.

An intermediate member 136 serves as a rail attachment member 38 for the two lower curved guiding apparatuses, and two track rails 1 of the curved guiding apparatuses 133 are attached to the intermediate member 136. The intermediate member 136 also serves as a block attachment member 39 for two upper curved guiding apparatuses 134, and four bearing blocks 10 of the two upper curved guiding apparatuses 134 are attached to the intermediate member 136.

The moving base 137 serves as a rail attachment member 38 for the two upper curved guiding apparatuses 134, and two track rails 1 of the curved guiding apparatuses 134 are attached to the moving base 137.

Figure 11A:
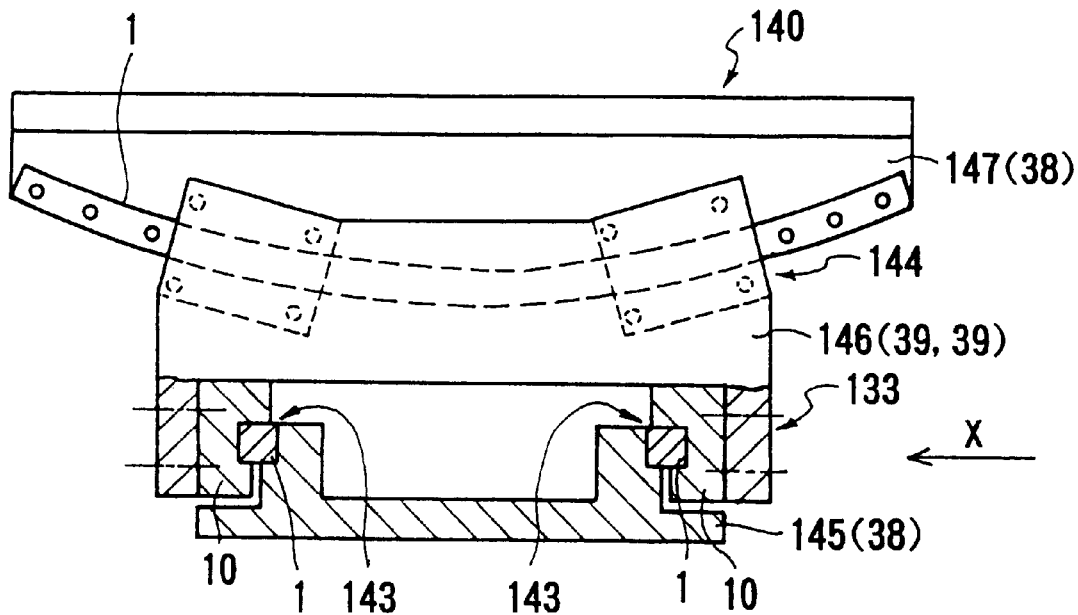
FIGS. 11A and 11B are views showing a third modification of the second embodiment of the three-dimensional guiding apparatus according to the present invention, FIG. 11A being a fragmentary sectional front elevational view and FIG. 11B a fragmentary sectional side elevational view as viewed in the direction indicated by the arrow X in FIG. 11A.
Figure 11B:
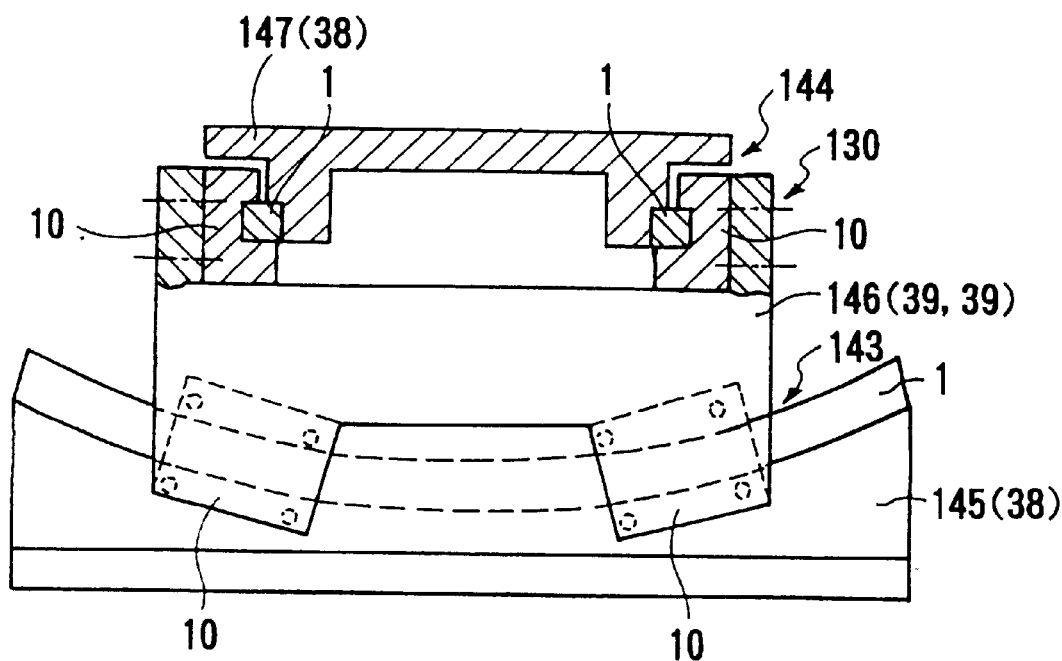
Figure 12A:
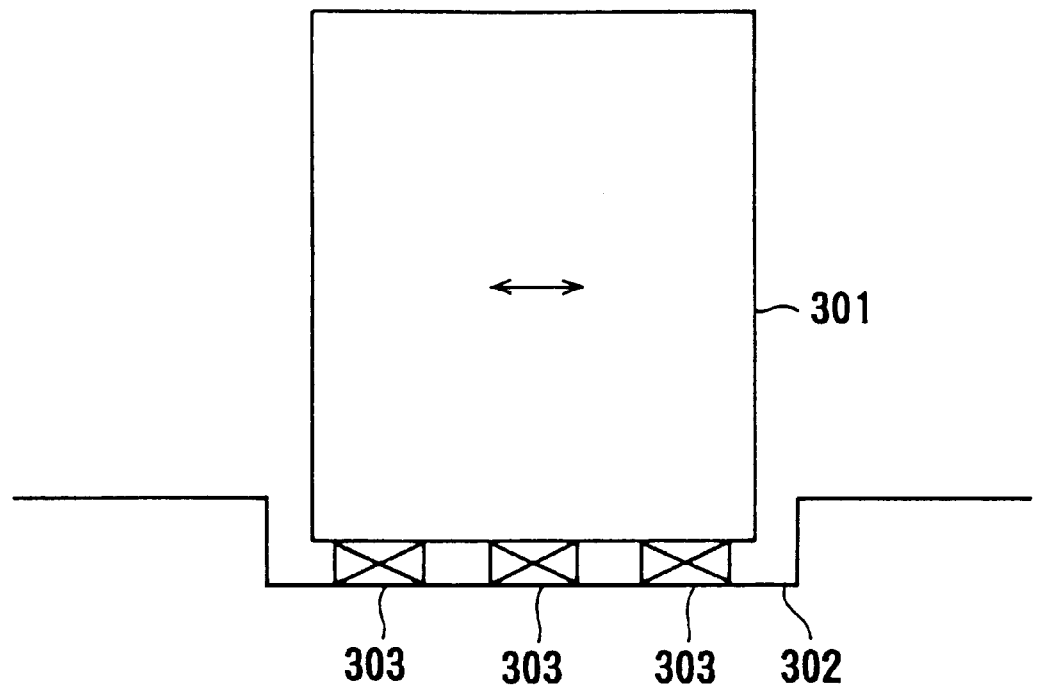
FIGS. 12A and 12B are views schematically showing a vibration isolating structure of a vibration-isolated building.
Figure 12B:
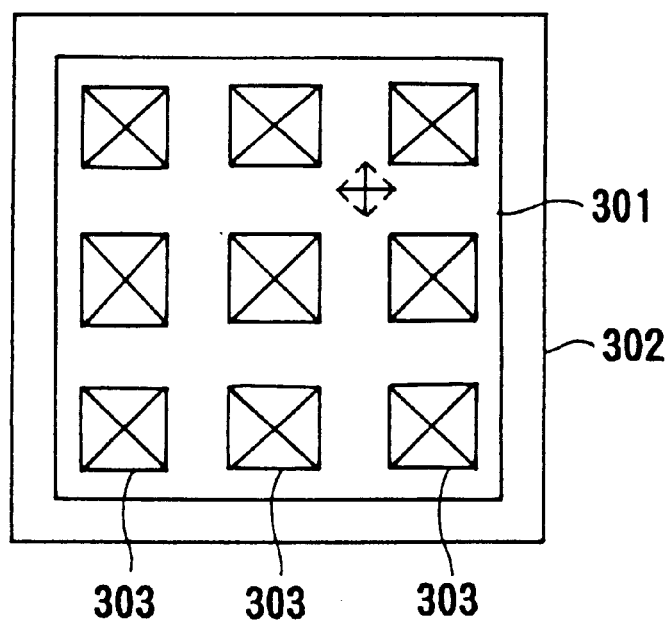

FIGS. 11A and 11B schematically show a third modification of the second embodiment.

In a three-dimensional guiding apparatus 140 according to the third modification, a base 145 serves as a rail attachment member 38 for two lower curved guiding apparatuses 143, and two track rails 1 are attached to the base 145 which is fixed to a foundation.

An intermediate member 146 serves as a block attachment member 39 for the two lower curved guiding apparatuses. Four bearing blocks 10 of the two curved guiding apparatuses 143 are attached to the intermediate member 146. The intermediate member 146 also serves as a block attachment member 39 for two upper curved guiding apparatuses 144, and four bearing blocks 10 of the two upper curved guiding apparatuses 144 are attached to the intermediate member 146.

A moving base 147 serves as a rail attachment member 38 for the two upper curved guiding apparatuses 144, and two track rails 1 of the curved guiding apparatuses 144 are attached to the moving base 147.

In each of the above modifications, as with the three-dimensional guiding apparatus according to the second embodiment, elastic members 26 are attached to the base and the moving base, and the three-dimensional guiding apparatus may be disposed between the foundation 60 and the building 61, thus providing a vibration isolating structure for the building.

[3rd Embodiment]

Figure 15:
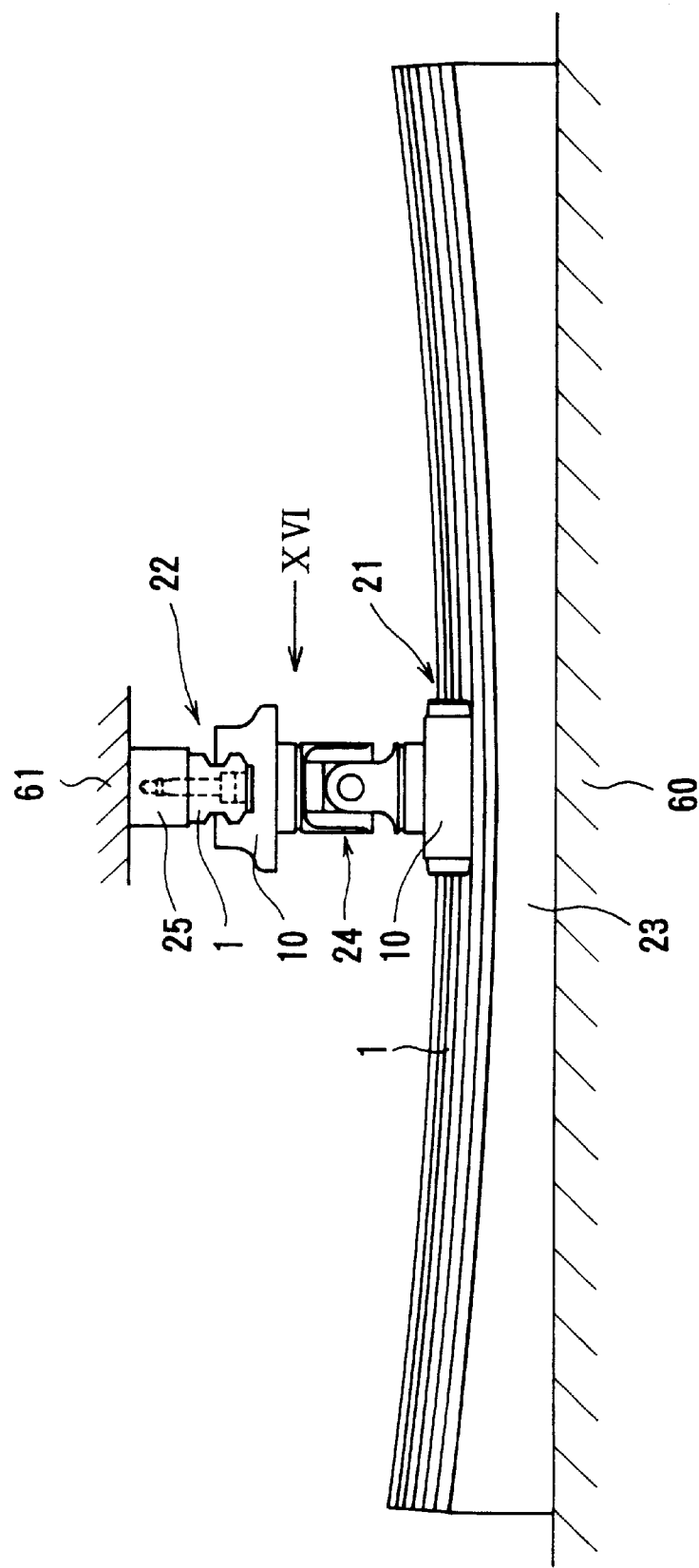
FIG. 15 is a front elevational view showing a third embodiment of the three-dimensional guiding apparatus according to the present invention.
Figure 16:
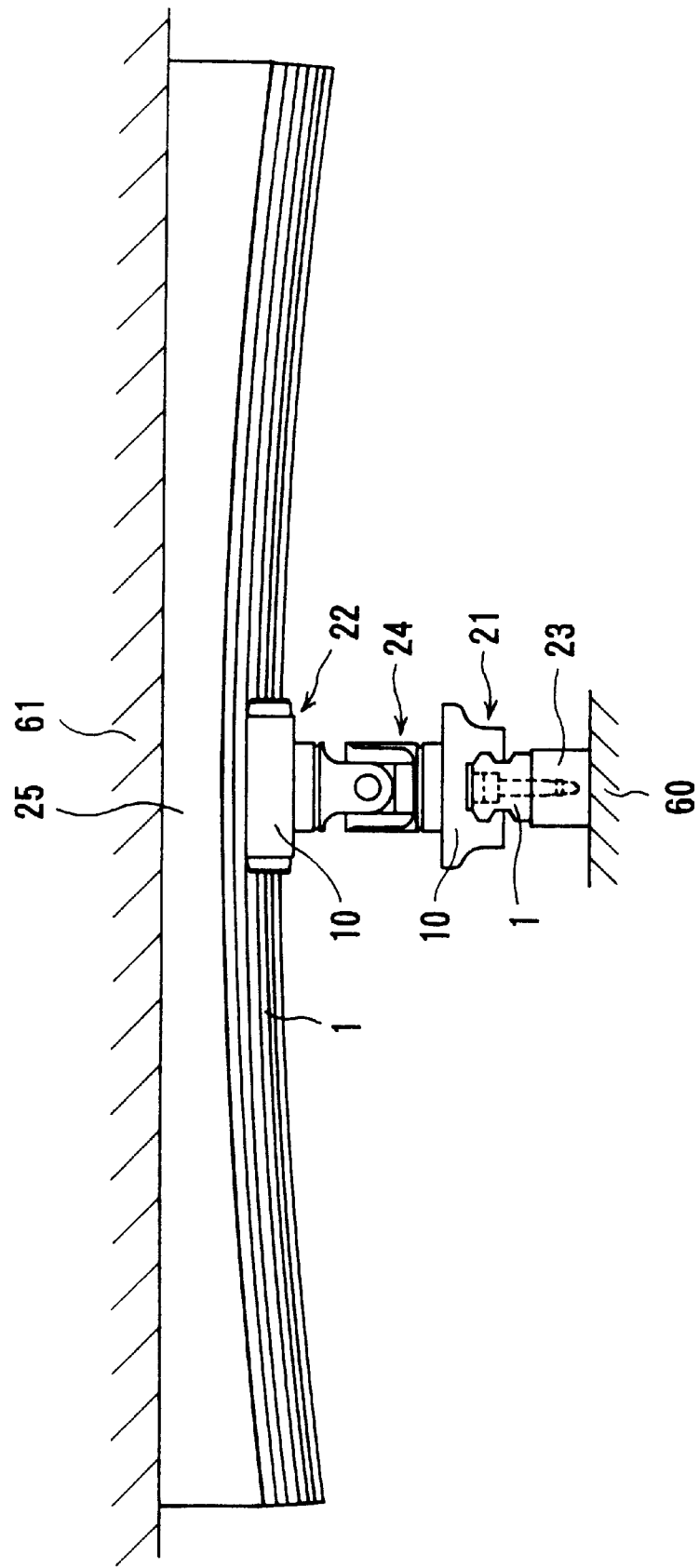
FIG. 16 is a view as viewed in the direction indicated by the arrow XVI in FIG. 15.

A three-dimensional guiding apparatus according to a third embodiment of the present invention will be described below. FIGS. 15 and 16 show the three-dimensional guiding apparatus according to the third embodiment. FIG. 15 is a front elevational view of the three-dimensional guiding apparatus, and FIG. 16 is a view as viewed in the direction indicated by the arrow XVI in FIG. 15.

As shown in FIGS. 15 and 16, the three-dimensional guiding apparatus comprises a base 23 fixed to a foundation 60, a first curved guiding apparatus 21 mounted on the base 23 and having an arcuate track, a second curved guiding apparatus 22 disposed above the first curved guiding apparatus 21 and having a plane of movement along an arcuate track crossing the plane of movement of the first curved guiding apparatus 21, and an intermediate member 24 positioned between the first curved guiding apparatus 21 and the second curved guiding apparatus 22 and interconnecting the first curved guiding apparatus 21 and the second curved guiding apparatus 22. A moving base 25 on which a building 61 is supported is fixedly mounted on the second curved guiding apparatus 22. In this example, the intermediate member 24 comprises a universal joint for absorbing tilts between the first curved guiding apparatus 21 and the second curved guiding apparatus 22. The intermediate member 24 may comprise a spherical bearing, a spring, an elastic member of rubber of the like, rather than the universal joint.

Figure 17:
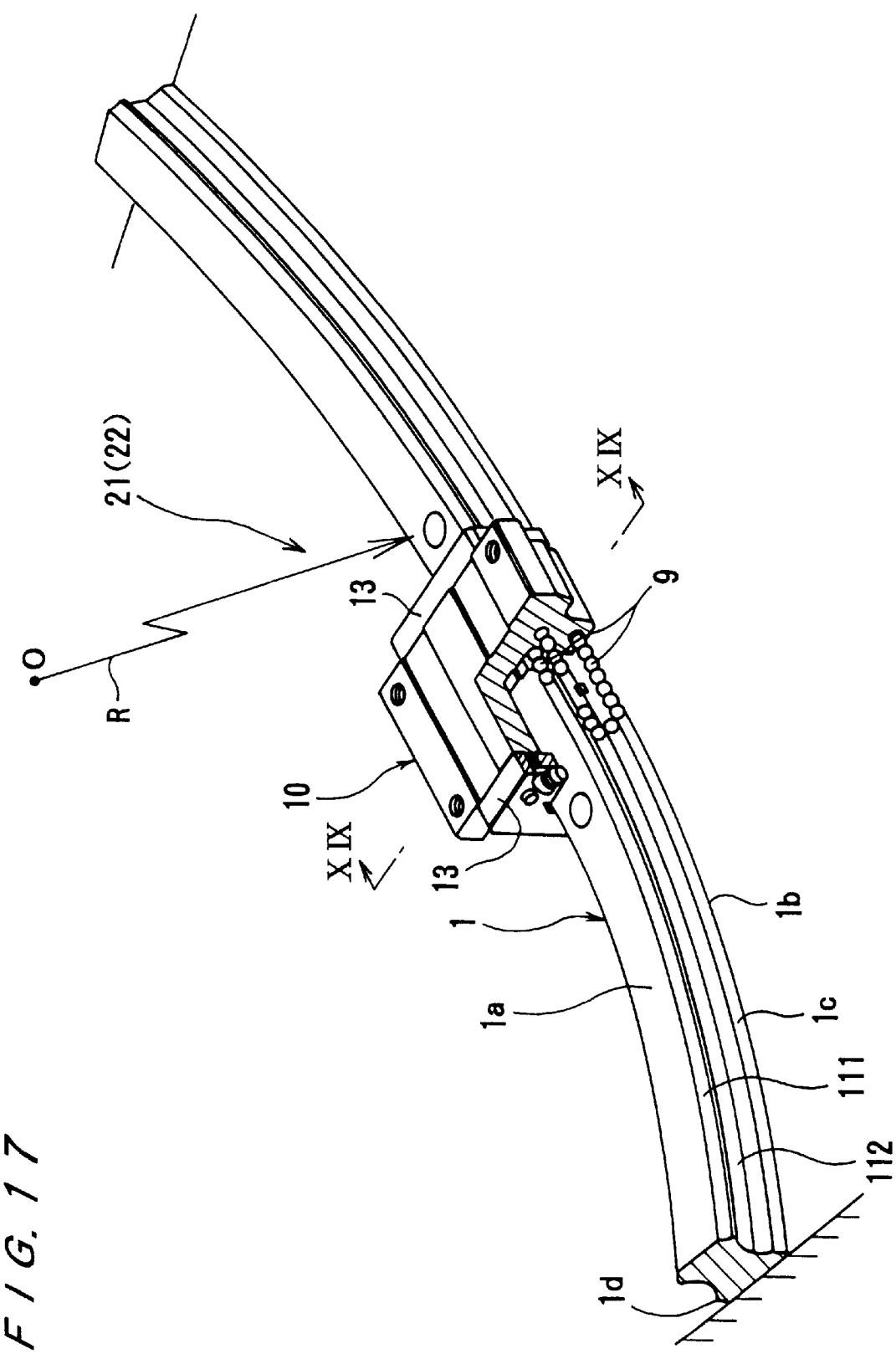
FIG. 17 is a perspective view of a first (second) curved guiding apparatus of the third embodiment of the present invention.
Figure 18:
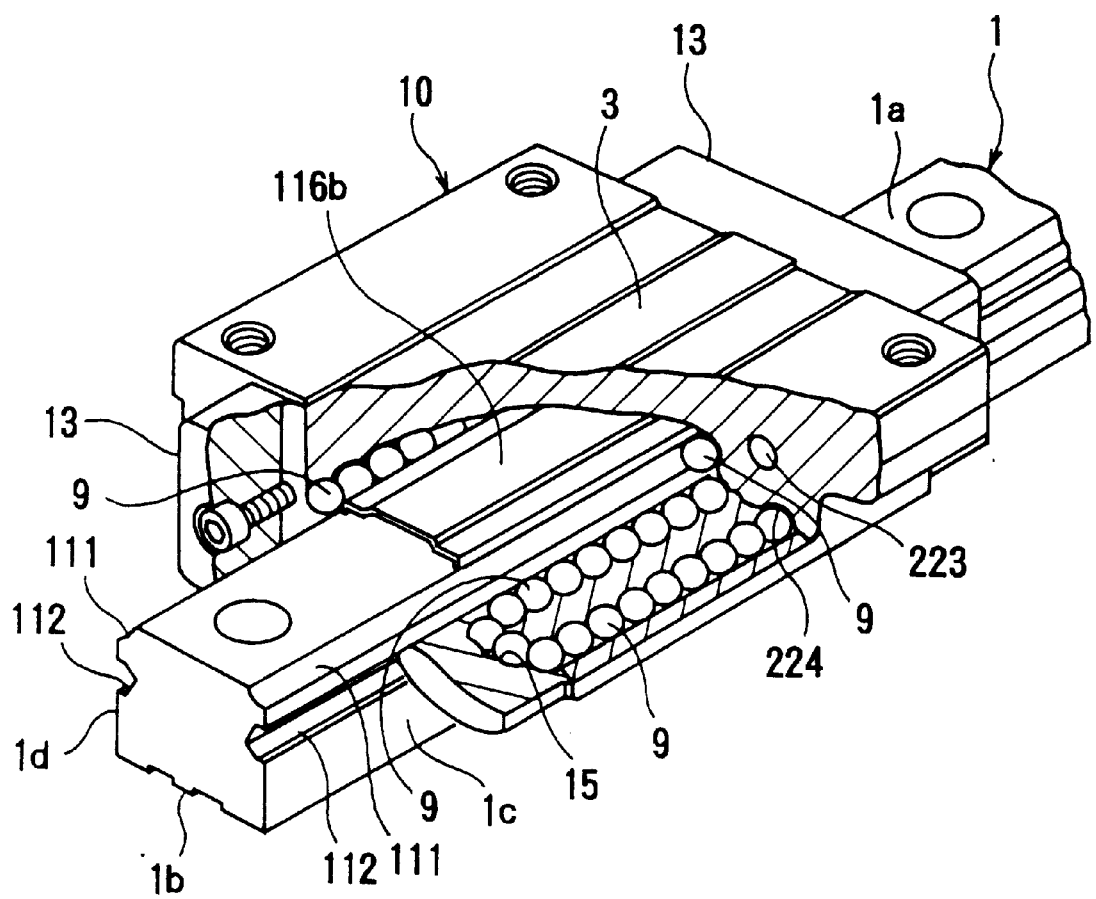
FIG. 18 is an enlarged fragmentary view of the first (second) curved guiding apparatus shown in FIG. 17.
Figure 20:
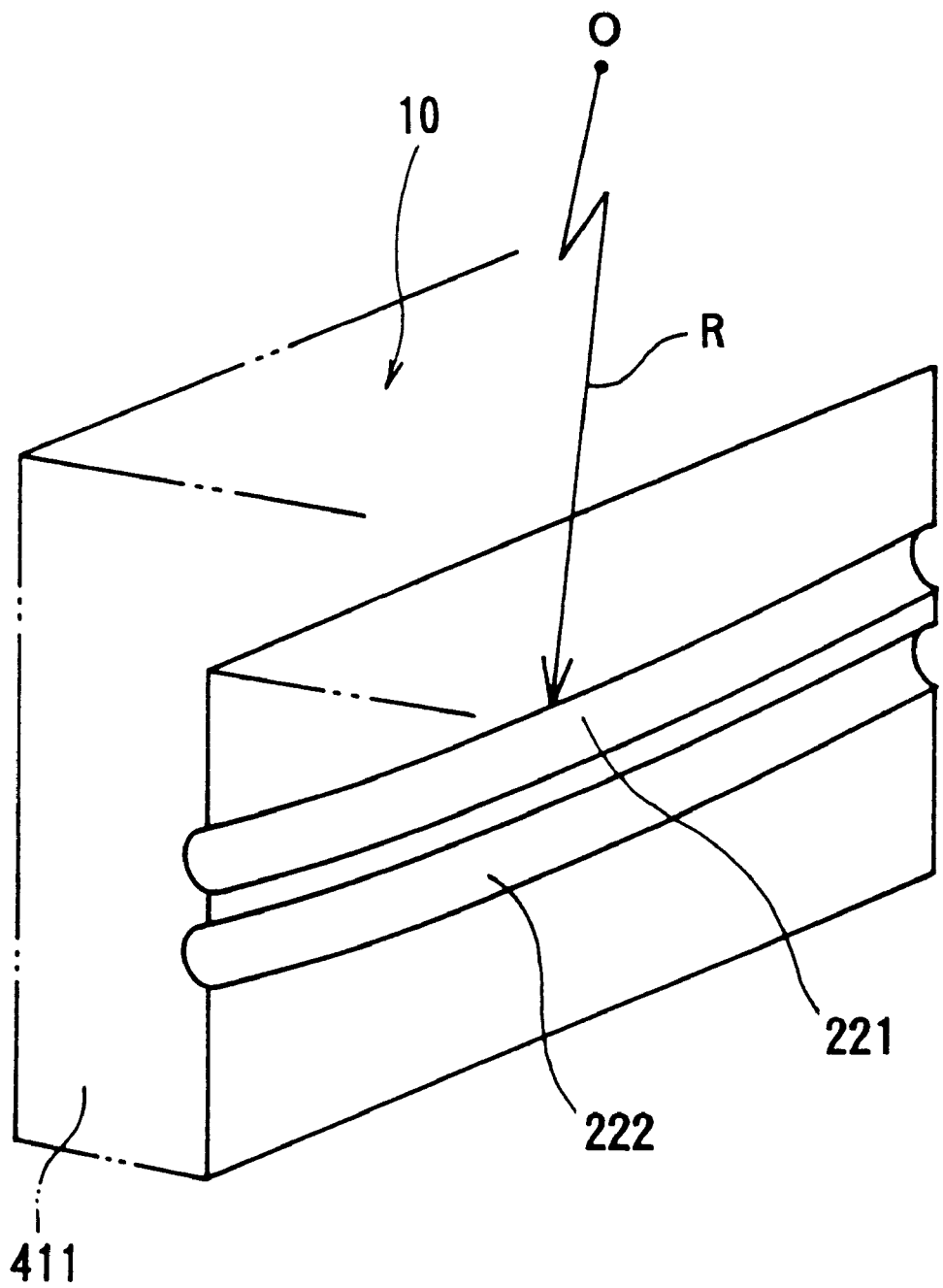
FIG. 20 is a perspective view showing ball rolling grooves defined in a bearing block.

The first curved guiding apparatus 21 and the second curved guiding apparatus 22 are identical in structure to each other, and are arranged such that upper surfaces of bearing blocks 10 thereof confront each other. FIGS. 17 through 20 show details of the first curved guiding apparatus 21 and the second curved guiding apparatus 22. FIG. 17 is a perspective view of the first and second curved guiding apparatus 21 (22), FIG. 18 is an enlarged fragmentary view of the first and second curved guiding apparatus 21 (22), FIG. 19 is a cross-sectional view taken along line XIX—XIX of FIG. 17, and FIG. 20 is a perspective view showing ball rolling grooves defined in a bearing block.

As shown in FIG. 17, the first (second) curved guiding apparatus 21 (22) comprises a curved track rail 1 curved vertically at a predetermined curvature, and a bearing block 10 slidably supported on the curved track rail 1 by a number of balls 9 disposed in an endless ball circulation path.

The curved track rail 1 has a substantially rectangular cross-sectional shape and is vertically curved to an arcuate shape of predetermined curvature. The center O of curvature of the curved track rail 1 is positioned in a vertically upward location, and has a radius R of curvature. The curved track rail 1 has an upper concave surface 1a and a lower convex surface 1b.

As shown in FIGS. 18 and 19, the curved track rail 1 has a pair of ball rolling grooves 111, 112 defined in each of left and right side surfaces 1c, 1d thereof along an arcuate shape of predetermined curvature. The bearing block 10 comprises a connecting portion 3 and a pair of left and right skirts 411, 412 extending downwardly from opposite ends of the connecting portion 3. The connecting portion 3 and the skirts 411, 412 jointly define a downwardly open recess. Each of the skirts 411, 412 has a pair of upper and lower ball rolling grooves 221, 222 defined therein in alignment with the respective ball rolling grooves 111, 112 along an arcuate shape of predetermined curvature (radius R of curvature).

The bearing block 10 also has two pairs of upper and lower non-loading ball holes 223, 224 defined therein adjacent to the ball rolling grooves 221, 222 and in alignment with the respective ball rolling grooves 221, 222. As shown in FIG. 18, lids 13 are mounted respectively on front and rear ends of the bearing block 10. The lids 13 have ball direction changing passages 15 defined in inner surfaces thereof which provide communication between the ball rolling grooves 121, 122 and the non-loading ball holes 223, 224, thereby providing endless circulation passages. The balls 9 circulate through the endless circulation passages and roll while bearing loads between the ball rolling grooves 111, 112 of the curved track rail 1 and the ball rolling grooves 221, 222 of the bearing block 10. As shown in FIG. 19, a pair of lower holder plates 116a and an upper holder plate 116b are fixedly disposed in the recess of the bearing block 10. The balls 9 are held in the bearing block 10 by the holder plates 116a, 116b.

Rolling surfaces of the ball rolling grooves 111, 112, 221, 222 comprise circular grooves defined by curved surfaces having a radius of curvature which is greater than the radius of the balls 9. Each of the ball rolling grooves 111, 112, 221, 222 has a contact surface against which the balls 9 are held in contact while rolling. Contact angle lines interconnecting points of contact between the balls 9 and the confronting ball rolling grooves 111, 221 or 112, 222 are inclined to the direction in which loads are applied, by 45 degrees.

As shown in FIG. 19, when a heavy object 70 (shown by the imaginary lines) is placed on the upper surface of the bearing block 10, the weight W of the heavy object 70 acts vertically on central regions of the bearing block 10 and the track rail 1, and loaded equally in the ball rolling grooves 111, 112, 221, 222 of the bearing block 10 and the track rail 1. Therefore no bending moment is applied to the bearing block 10 and the track rail 1.

FIG. 20 shows in perspective the upper and lower ball rolling grooves 221, 222 defined in the bearing block 10 along an arcuate shape of predetermined curvature, and are downwardly convex. The ball rolling grooves 221, 222 have a center O of curvature at an upper position in the vertical direction and a radius R of curvature. The ball rolling grooves 221, 222 have a depth that is constant in the longitudinal direction of the bearing block 10. The ball rolling grooves 111, 112 defined in the side surfaces 1c, 1d of the curved track rail 1 are also vertically arcuate in shape at a predetermined curvature (radius R of curvature).

[Modifications of 3rd Embodiment]

Figure 22:
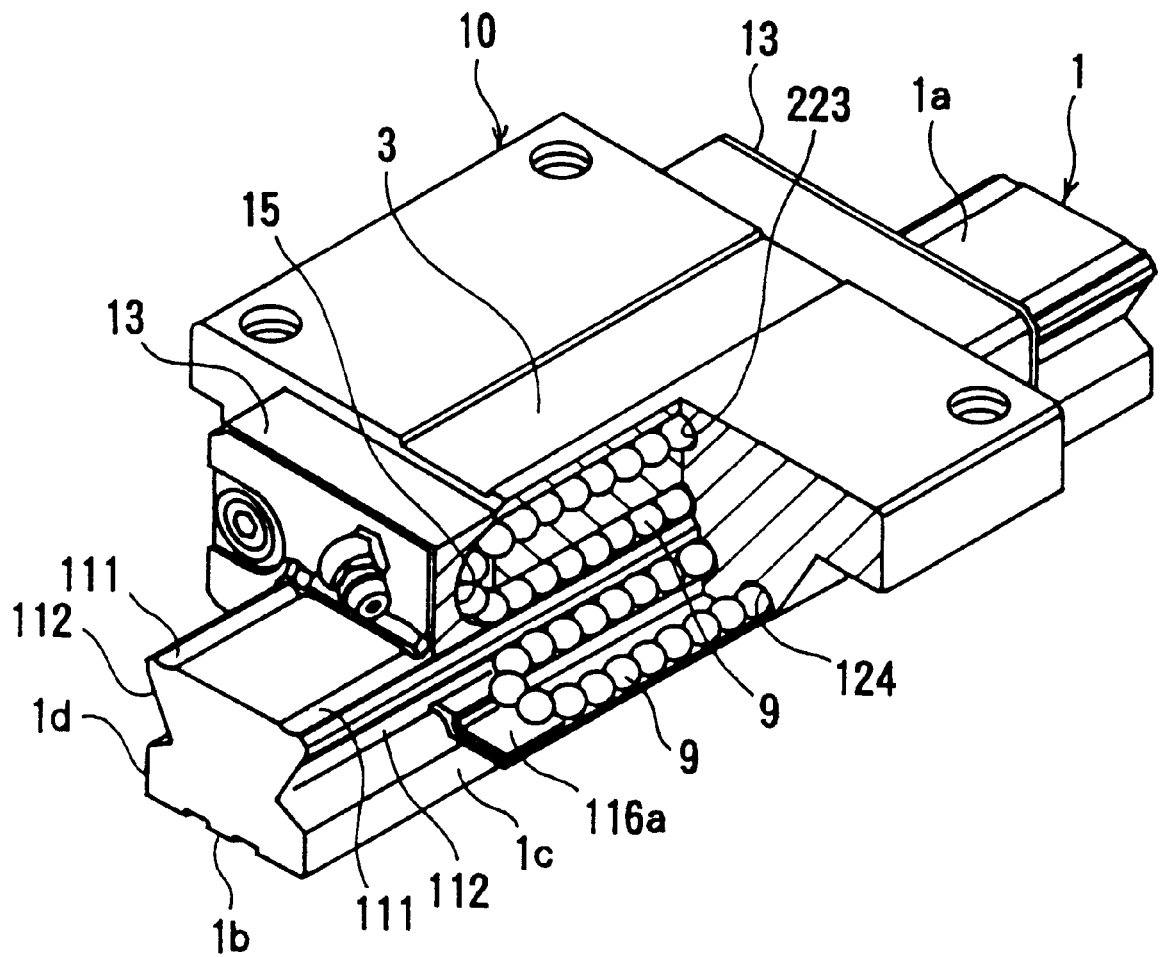
FIG. 22 is a perspective view of the modification of the first (second) curved guiding apparatus of the third embodiment of the present invention.

A modification of the third embodiment of the curved guiding apparatus will be described below with reference to FIGS. 21 through 23. FIG. 21 is a cross-sectional view of a first (second) curved guiding apparatus, and FIG. 22 is a perspective view of the first (second) curved guiding apparatus. Those components of the modification shown in FIGS. 21 and 22 which operate in the manner identical to the embodiment shown in FIGS. 17 through 20 are denoted by identical reference characters.

The curved track rail 1 and the bearing block 10 have major structures that are the same as those of the embodiment shown in FIGS. 17 through 20, but differ therefrom with respect to the ball rolling grooves. In the curved guiding apparatus according to this modification, as shown in FIGS. 21 and 22, upper ball rolling grooves 111 are defined in an upper surface 1a of a curved track rail 1, and upper ball rolling grooves 221 are defined in a lower surface of a connecting portion 3 of a bearing block 10. The curved track rail 1 has lower ball rolling grooves 112 defined in left and right side surfaces 1c, 1d thereof along an arcuate shape of predetermined curvature. The skirts 411, 412 of the bearing block 10 have lower ball rolling grooves 222 defined therein in alignment with the lower ball rolling grooves 112 along an arcuate shape of predetermined curvature. Other structural details are identical to those of the embodiment shown FIGS. 17 through 20.

Contact angle lines interconnecting points of contact between the balls 9 and the confronting ball rolling grooves 111, 221 are aligned with the vertical direction (the direction in which loads are applied). Contact angle lines interconnecting points of contact between the balls 9 and the confronting ball rolling grooves 112, 222 are inclined to the horizontal direction by 30 degrees.

Figure 23:
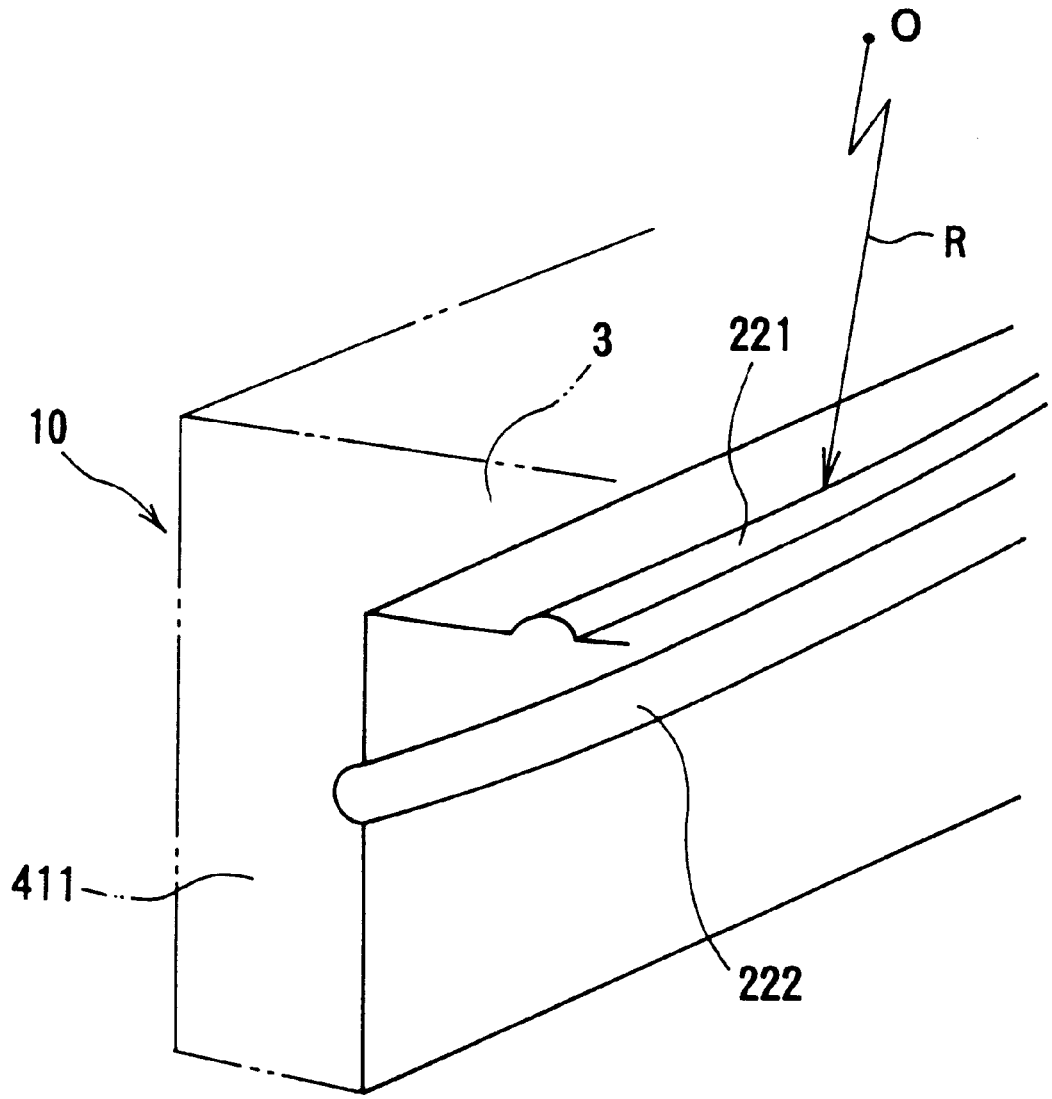
FIG. 23 is a perspective view showing ball rolling grooves defined in a bearing block.

FIG. 23 shows in perspective upper and lower ball rolling grooves 221, 222 defined in the connecting portion 3 and the skirt 411 of the bearing block 10. The upper and lower ball rolling grooves 221, 222 are vertically arcuate in shape at a predetermined curvature (radius R of curvature). The upper and lower ball rolling grooves 221, 222 are downwardly convex.

[2nd modification of 3rd Embodiment]

Figure 25:
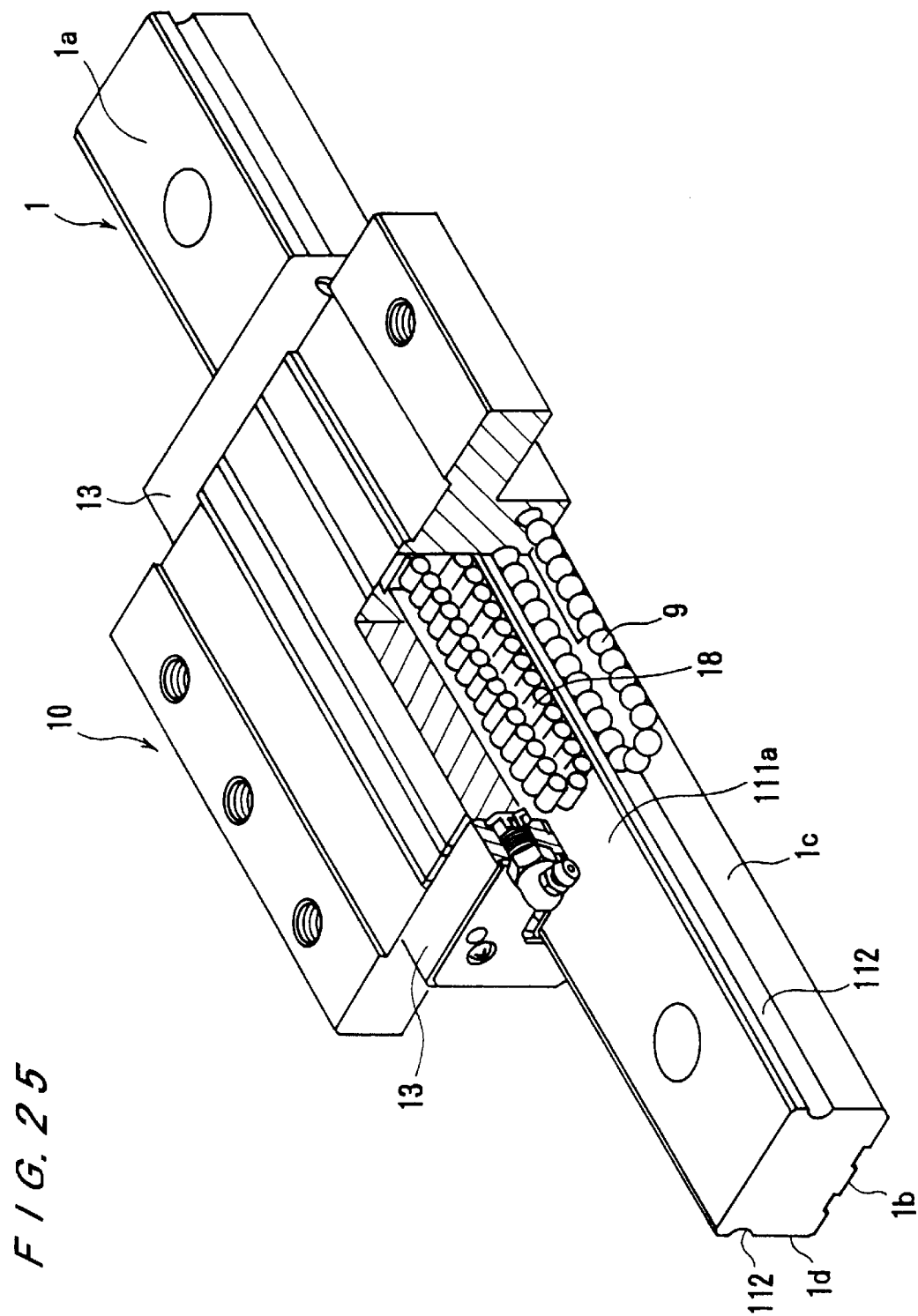
FIG. 25 is a perspective view of the second modification of the first (second) curved guiding apparatus of the third embodiment of the present invention.

A second modification of the third embodiment of the curved guiding apparatus will be described below with reference to FIGS. 24 through 26. FIG. 24 is a cross-sectional view of a curved guiding apparatus, and FIG. 25 is a perspective view of the curved guiding apparatus. Those components of the modification shown in FIGS. 24 and 25 which operate in the manner identical to the embodiment shown in FIGS. 21 through 23 are denoted by identical reference characters.

The curved track rail 1 and the bearing block 10 have major structures that are the same as those of the embodiment shown in FIGS. 21 through 23, but differ therefrom with respect to the ball rolling grooves. In the curved guiding apparatus according to this modification, as shown in FIGS. 24 and 25, an upper rail surface 1a of a curved track rail 1 has parallel roller rolling surfaces 111a along the track rail 1 on which short cylindrical rollers 18 roll. A lower surface of the connecting portion 3 of the bearing block 10 has parallel roller rolling surfaces 221a along an arcuate shape of predetermined curvature (radius r of curvature) in alignment with the roller rolling surfaces 111a of the upper surface 1a of the track rail 1. The bearing block 10 has non-loading roller holes 223a defined in an upper surface thereof for receiving rollers 18.

The curved track rail 1 has a ball rolling groove 112 defined in each of left and right side surfaces 1c, 1d thereof along an arcuate shape of predetermined curvature. Skirts 411, 412 of the bearing clock 10 have a pair of ball rolling grooves 222 defined therein in alignment with the lower ball rolling grooves 112 of the curved track rail 1 along an arcuate shape of predetermined curvature. Other structural details are identical to those of the embodiment shown in FIGS. 21 through 23. Contact angle lines interconnecting points of contact between the rollers 18 and the confronting ball rolling grooves 111a, 221a are aligned with the vertical direction (the direction in which loads are applied). Contact angle lines interconnecting points of contact between the balls 9 and the confronting lower ball rolling grooves 112, 222 are inclined to the horizontal direction by 30 degrees.

In this embodiment, radial loads are borne by two ball rows and two roller rows, and the short cylindrical rollers are employed. Therefore, the curved guiding apparatus has a very high radial load bearing capability for bearing large loads, and is highly rigid.

Figure 26:
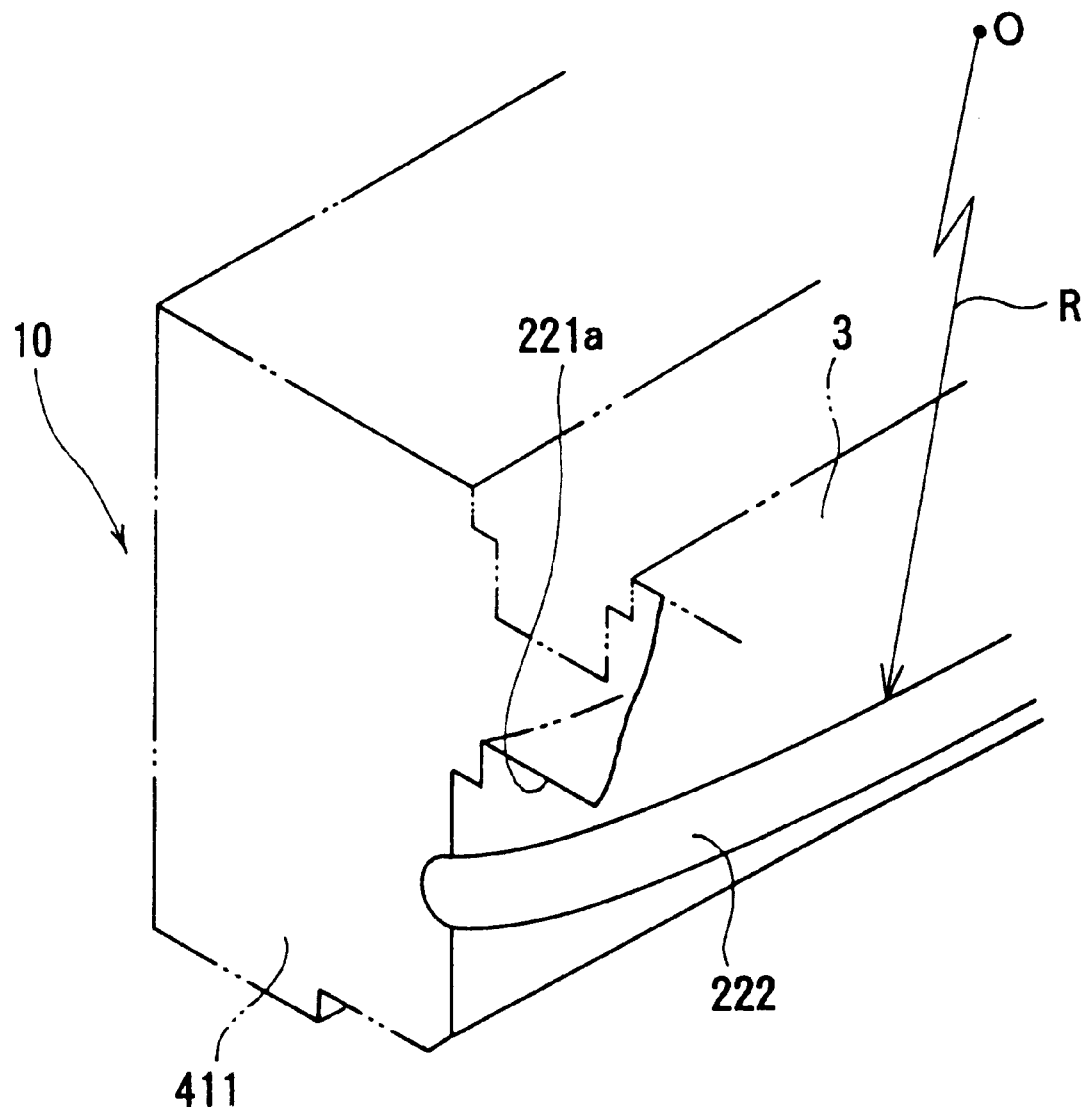
FIG. 26 is a perspective view showing a ball rolling groove defined in a bearing block.

FIG. 26 shows in perspective the roller rolling surface 221a on the connecting portion 3 of the bearing block 10 and the ball rolling groove 222 in the skirt 411 of the bearing block 10. The roller rolling surface 221a and the ball rolling groove 222 are vertically arcuate in shape at a predetermined curvature (radius R of curvature), and are downwardly convex.

According to the third embodiment and its modifications as described above, since no bending moment is applied to the bearing block and the curved track rail by loads from the building, the bearing block will not be deformed, and the curved track rail will not be warped, so that they can guide highly accurate arcuate motions in the vertical direction. Since radial loads are borne by four ball rows or two ball rows and two roller rows, the guiding apparatus has a very high radial load bearing capability, and hence is of a structure suitable for a vibration isolator for supporting buildings. If the intermediate member 24 positioned between the first curved guiding apparatus 21 and the second curved guiding apparatus 22 comprises a flexible connecting portion, then a building may be fixed mounted directly on the moving base 25.

Figure 27:
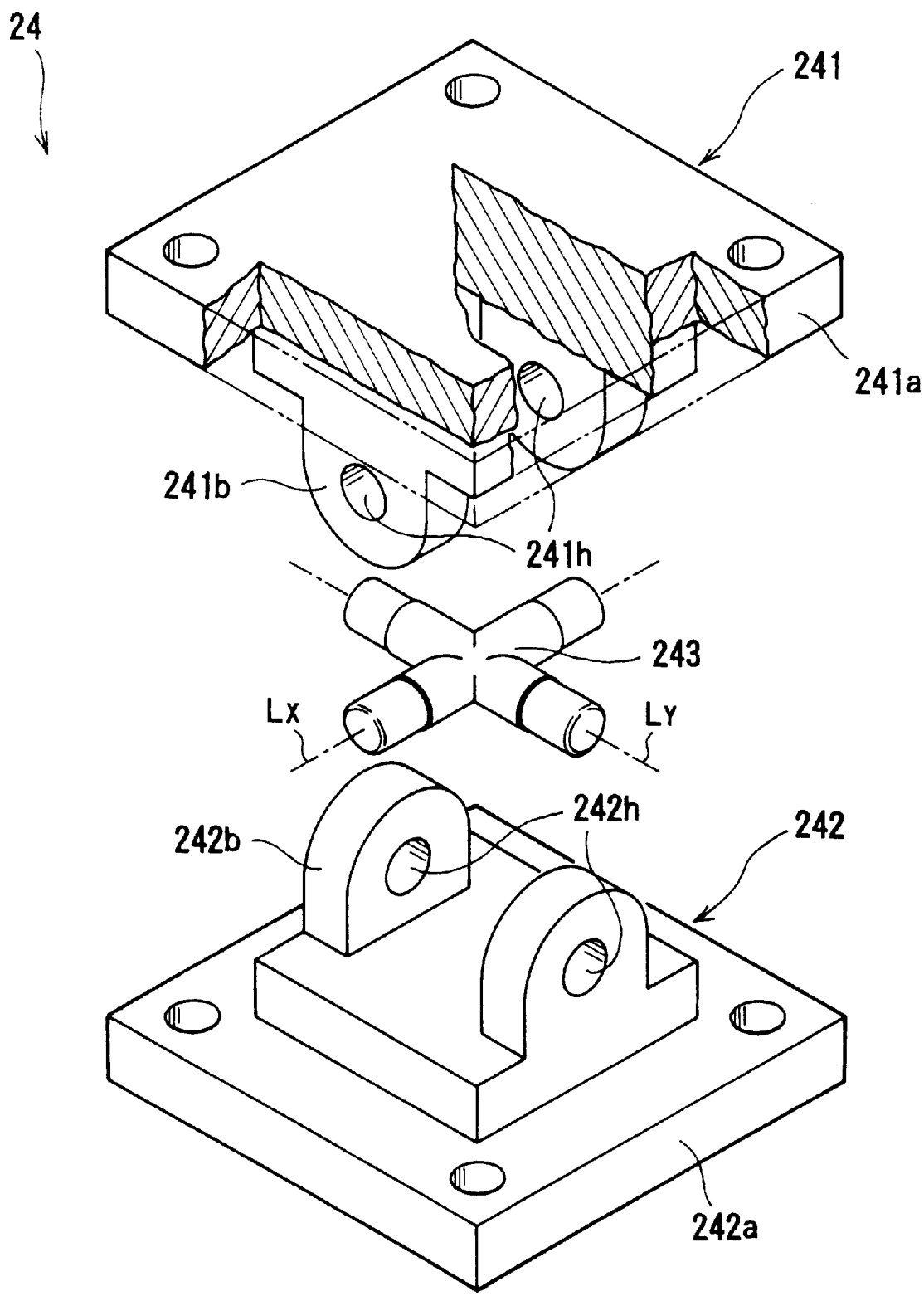
FIG. 27 is an exploded perspective view of an example of an intermediate member according to the third embodiment of the present invention.

FIG. 27 shows in exploded perspective an example of the intermediate member 24 which can preferably be applied to the third embodiment and its modifications. The intermediate member 24 comprises a universal joint. As shown in FIG. 27, the intermediate member 24 comprises a pair of upper and lower yoke members 241, 242, and a cross shaft 243 connecting the yoke members 241, 242 and having two crossing axes $L_x$, $L_y$. The yoke members 241, 242 comprise respective flanges 241a, 242a fixed to the bearing block 10 and respective yokes 241b, 242b integral with the respective flanges 241a, 242a. The cross shaft 243 has shaft ends rotatably inserted in respective holes 241h, 242h defined in the yokes 241b, 242b, thus interconnecting the upper and lower yoke members 241, 242.

The intermediate member 24 of the above structure is capable of transmitting torques between upper and lower bearing blocks 10 and of allowing the upper and lower bearing blocks 10 to change their orientations freely with respect to each other. Furthermore, since the shaft ends of the cross shaft 243 are inserted in the yokes 241b, 242b, the upper and lower bearing blocks 10 are firmly coupled to each other without the danger of being separated from each other.

If the intermediate member 24 which comprises a universal joint as shown in FIG. 27 is applied to a vibration isolator, then the axis $L_x$ of the cross shaft 243 is aligned with the axis of a curved track rail 1, and the other axis $L_y$ of the cross shaft 243 is aligned with the axis of another curved track rail 1. In this manner, the directions in which the intermediate member 24 is tilted are held in alignment with the axial directions of the upper and lower curved track rails 1.

When the foundation is vibrated by an earthquake due to earth crust fluctuations, the building moves along the upper and lower curved track rails 1. This is because though the seismic vibrations occur in arbitrary directions, the acceleration thereof is divided into components in X, Y directions of the track rails 1. Even when the building swings, the building is kept horizontal by the intermediate member 24 which has a tilt absorbing capability. Since the upper and lower curved track rails 1 can always be held in perpendicularly crossing directions, it is highly easy to orient a plurality of three-dimensional guiding apparatuses in a desired direction when they are fixedly disposed below the building. Stated otherwise, once the curved track rails 1 on the foundation are oriented, the orientation of the curved track rails 1 on the building is necessarily determined, and hence does not need to be established by another process.

Figure 28:
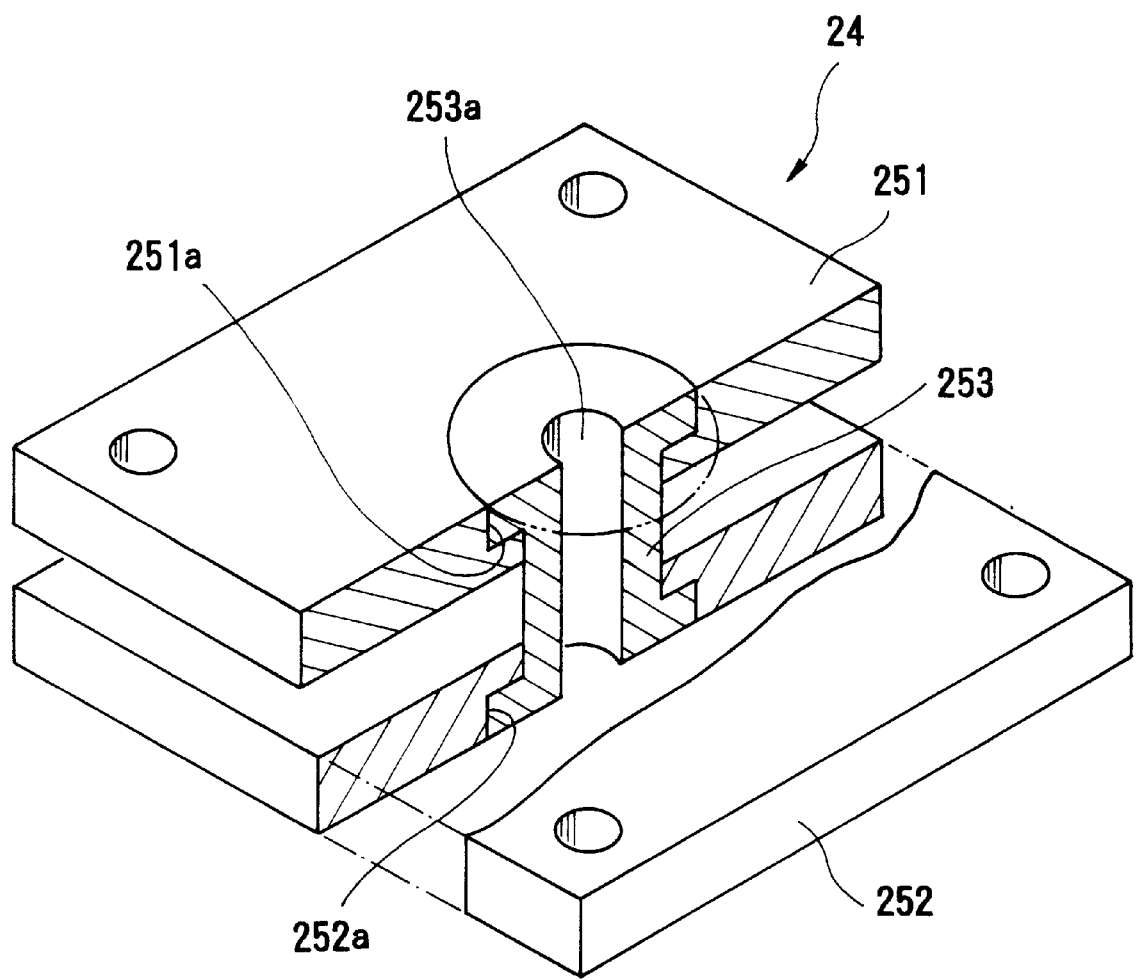
FIG. 28 is a perspective view of another example of an intermediate member according to the third embodiment of the present invention.
Figure 29:
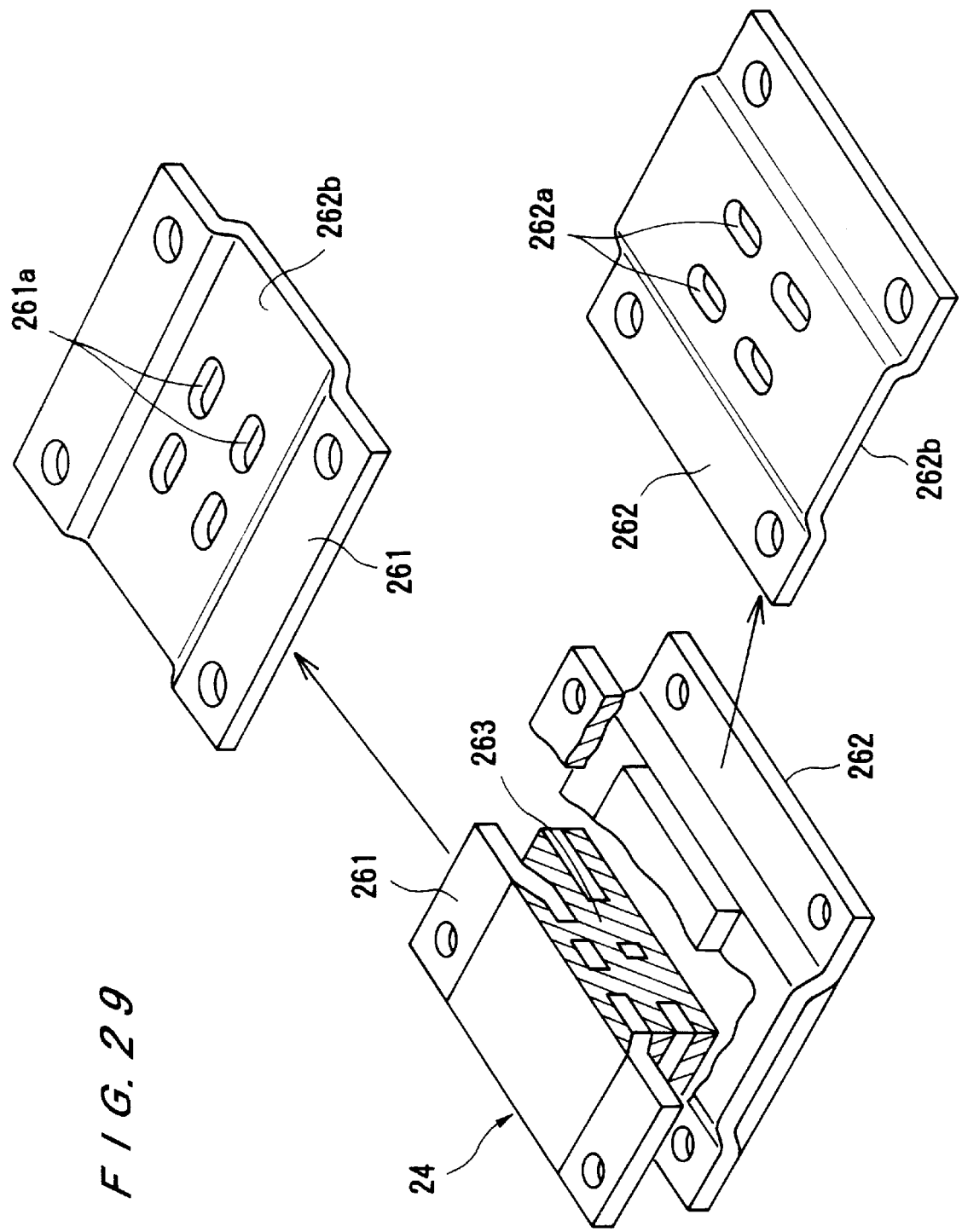
FIG. 29 is a perspective view of still another example of an intermediate member according to the third embodiment of the present invention.
Figure 30:
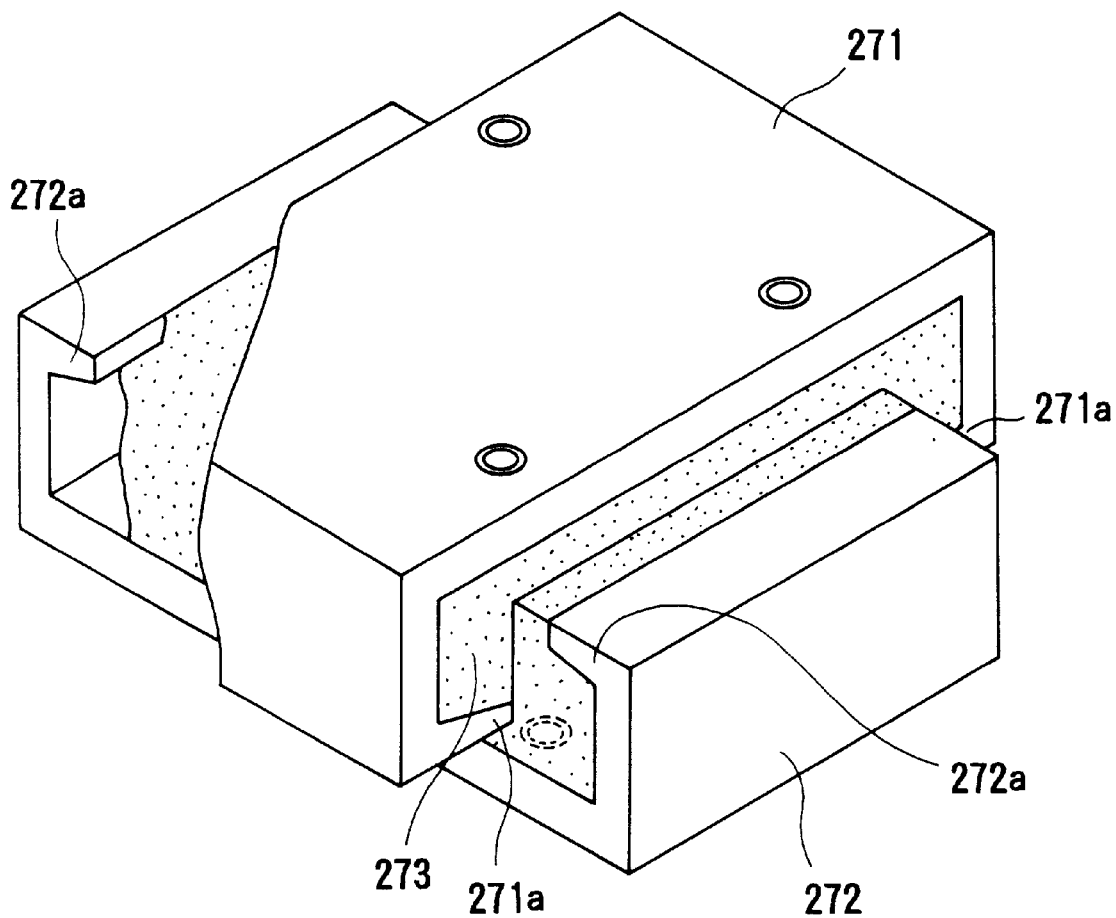
FIG. 30 is a perspective view of yet still another example of an intermediate member according to the third embodiment of the present invention.

FIGS. 28 through 30 show in perspective, partly cut away, other examples of the intermediate member 24 which can preferably be applied to the third embodiment and its modifications. In FIGS. 28 through 30, the intermediate member 24 has an elastic member as its major component. In the example shown in FIG. 28, the intermediate member 24 comprises a pair of upper and lower attachment plates 251, 252 and a hollow elastic member 253 of rubber interconnecting the upper and lower attachment plates 251, 252. The elastic member 253 is integrally joined to the upper and lower attachment plates 251, 252 by being cured in holes 251a, 252a defined in the attachment plates 251, 252.

The elastic member 253 has a central through hole 253a defined therein. The attachment plates 251, 252 are fixed to the respective upper and lower bearing blocks 10 (see FIGS. 15 and 16). When the foundation is vibrated by an earthquake due to earth crust fluctuations, the building moves along the upper and lower curved track rails 1 due to the acceleration of the seismic vibrations. This is because though the seismic vibrations occur in arbitrary directions, the acceleration thereof is divided into components in X, Y directions of the track rails 1. Even when the building swings, the building is kept horizontal by the intermediate member 24 which has a tilt absorbing capability. Errors of the perpendicularity between the upper and lower curved track rails 1 can be absorbed due to the elastic deformation of the elastic member 253 of the intermediate member 24.

In the example shown in FIG. 29, the intermediate member 24 comprises a pair of upper and lower attachment plates 261, 262 in the form of thin plates and an elastic member 263 of rubber interconnecting the upper and lower attachment plates 261, 262. The upper and lower attachment plates 261, 262 have a plurality of through holes 261a, 262a defined therein. The elastic member 263 is filled between the upper and lower attachment plates 261, 262 and in the through holes 261a, 262a by molding. Since the elastic member 263 is filled in the through holes 261a, 262a in the upper and lower attachment plates 261, 262 and also in recesses 261b, 262b of the upper and lower attachment plates 261, 262, the upper and lower attachment plates 261, 262 and the elastic member 263 are well joined to each other.

In the example shown in FIG. 30, the intermediate member 24 comprises a pair of upper and lower attachment plates 271, 272 and an elastic member 273 of rubber interconnecting the upper and lower attachment plates 271, 272. The upper and lower attachment plates 271, 272 are a substantially channel-shaped cross sectional shape and have opposite ends bent inwardly into bent flanges 271a, 272a. The upper and lower attachment plates 271, 272 and the elastic member 273 can be integrally joined to each other by placing the upper and lower attachment plates 271, 272 in a mold and filling the elastic member 273 between the attachment plates 271, 272.

With the intermediate members 24 shown in FIGS. 28 through 30, the elastic members 253, 263, 273 are elastically deformed to absorb tilts between the upper and lower bearing blocks 10. By appropriately selecting the properties and shape of the elastic member (rubber), the intermediate members 24 are capable of providing an optimum tilting function in view of the characteristics of the building and the foundation.

As described above, the three-dimensional guiding apparatus according to the present invention has curved guiding apparatuses between the base and the intermediate member and between the intermediate member and the moving base. In the curved guiding apparatus, the bearing block smoothly moves along an arcuate path having a predetermined radius of curvature with respect to the track rail. The three-dimensional guiding apparatus can freely move along three-dimensional paths represented by a combination of two arcuate motions.

The track rail and the bearing block of each of the curved guiding apparatuses in the three-dimensional guiding apparatus are supported on the attachment member of the base, the intermediate member, and the moving base not only by the vertical attachment surfaces but also by the horizontal attachment surfaces. Therefore, they can reliably bear loads. Since the horizontal portions of the attachment members are arranged on a vertical line along which loads are applied, vertical loads between the rail attachment member and the block attachment member can directly be borne, resulting in a strong structure.

Consequently, the three-dimensional guiding apparatus can be used under high loads, operate smoothly, and can be used in a vibration isolating structure for buildings.

Industrial Applicability

The present invention relates to a three-dimensional guiding apparatus which can preferably be used in a vibration isolator for isolating building from vibrations.

What is claimed is:

1. A three-dimensional guiding apparatus comprising a base, a first curved guiding apparatus disposed above the base and having an arcuate track, a second curved guiding apparatus disposed above said first curved guiding apparatus and having a plane of movement along an arcuate track which crosses the plane of movement of said first curved guiding apparatus, and an intermediate member positioned between said first curved guiding apparatus and said second curved guiding apparatus and interconnecting said first curved guiding apparatus and said second curved guiding apparatus, each of said first and second curved guiding apparatuses comprising:
a track rail vertically curved at a predetermined curvature and having ball rolling grooves defined along an arcuate shape of predetermined curvature in opposite surfaces;
a bearing block having a connecting portion and a pair of skirts extending respectively from opposite ends of said connecting portion, said bearing block including ball rolling grooves defined in said skirts in alignment with said ball rolling grooves of said track rail along an arcuate shape of predetermined curvature, and non-loading ball passages defined in said skirts adjacent to said ball rolling grooves;
a pair of lids mounted respectively on front and rear ends of said bearing block and having respective ball direction changing passages defined in respective inner surfaces thereof, the ball direction changing passages connecting ends of said ball rolling grooves and said non-loading ball passages to provide endless ball circulation paths; and
a plurality of balls disposed to circulate in said endless ball circulation paths for bearing loads between said ball rolling grooves in said track rail and said ball rolling grooves in said bearing block.

2. A three-dimensional guiding apparatus according to claim 1, wherein each of said track rail and said bearing block has at least four ball rolling grooves.

3. A three-dimensional guiding apparatus according to claim 1, wherein at least one of said track rail and said bearing block has a ridge disposed between adjacent ball rolling grooves for preventing said track rail and said bearing block from moving relatively to each other in directions other than directions in which said track rail and said bearing block move relatively to each other while being guided by the balls.

4. A three-dimensional guiding apparatus according to claim 1, wherein a straight line interconnecting the point of contact between the ball and confronting ball rolling groove across the ball is inclined to a vertical line in which loads are applied, by an angle of 90° or less.

5. A three-dimensional guiding apparatus comprising a base, an intermediate member disposed above said base by a first curved guiding apparatus having a downwardly convex arcuate track, a moving base disposed above said intermediate member by a second curved guiding apparatus having a plane of movement along a downwardly convex arcuate track which crosses the plane of movement of said first curved guiding apparatus, each of said first and second curved guiding apparatuses comprising:

a track rail having a substantially rectangular cross-sectional shape and longitudinally curved at a predetermined radius of curvature and having ball rolling grooves defined longitudinally in an upper side surface closer to the center of curvature and a lower side surface opposite to said upper side surface; and a bearing block having a connecting portion and first and second skirts extending horizontally from upper and lower ends of said connecting portion in confronting relation to the respective upper and lower side surfaces of said track rail, said first and second skirts having ball rolling grooves and ball circulation paths, with a number of load-bearing balls disposed between said ball rolling grooves in said track rail and said ball rolling grooves in said bearing block;

wherein said first skirt on which vertical loads are not imposed has a dimension in a direction in which said ball rolling grooves are juxtaposed, said dimension being smaller than a dimension of said second skirt on which vertical loads are imposed, and one of the upper and lower side surfaces of said track rail has a surface on which vertical loads are not imposed and which is exposed as a horizontal attachment surface;

wherein said track rail is attached to a member having a vertical attachment surface and a horizontal attachment surface extending horizontally from an end of said vertical attachment surface, said horizontal attachment surface of said track rail is held against said horizontal attachment surface of said member, and a side surface of said track rail is attached to said vertical attachment surface of said member.

6. A three-dimensional guiding apparatus according to claim 5, wherein said bearing block is attached to a member having a horizontal attachment surface and a vertical attachment surface, said skirt on which vertical loads are imposed being held against said horizontal attachment surface of said member, and said connecting portion of said bearing block being attached to said vertical attachment surface of said member.

7. A three-dimensional guiding apparatus according to claim 5, wherein a plurality of said curved guiding apparatuses are juxtaposed between at least one of said base and said intermediate member and between said intermediate member and said moving base.

8. A three-dimensional guiding apparatus according to claim 5, wherein each of said first and second curved guiding apparatuses has a plurality of bearing blocks mounted on said track rail thereof.

9. A three-dimensional guiding apparatus according to claim 5, wherein each of said ball rolling grooves in said track rail and said skirts of each of said first and second curved guiding apparatuses has an arcuate surface having a radius of curvature slightly greater than the radius of said ball, said ball being held in contact with each of said ball rolling grooves at two confronting points, and wherein a straight line interconnecting the point of contact of said ball is inclined to a vertical line along which loads are applied, by an angle ($\theta$) of 90° or less.

10. A three-dimensional guiding apparatus according to claim 5, wherein each of said skirts comprises a skirt body and a lid mounted on an end of said skirt body in a direction in which said skirt moves, said skirt body having a ball delivery passage and said lid having a ball direction changing passage interconnecting a loading ball passage and a non-loading ball passage, the ball delivery passage and the ball direction changing passage jointly serving as said non-loading ball passage.

11. A three-dimensional guiding apparatus according to claim 5, wherein an elastic member is disposed on at least one of a lower surface of said base and an upper surface of said moving base.

12. A three-dimensional guiding apparatus according to claim 5, wherein said intermediate member comprises two upper and lower members, with an elastic member disposed between said two upper and lower members.

13. A three-dimensional guiding apparatus comprising a base, a first curved guiding apparatus disposed above said base and having an arcuate track, a second curved guiding apparatus disposed above said first curved guiding apparatus and having a plane of movement along an arcuate track which crosses the plane of movement of said first curved guiding apparatus, and an intermediate member positioned between said first curved guiding apparatus and said second curved guiding apparatus and interconnecting said first curved guiding apparatus and said second curved guiding apparatus, each of said first and second curved guiding apparatuses comprising:

a track rail vertically curved at a predetermined curvature and having ball rolling grooves defined along an arcuate shape of predetermined curvature in opposite side surfaces;

a bearing block having a connecting portion and a pair of skirts extending respectively from opposite ends of said connecting portion, said bearing block including ball rolling grooves defined in said skirts in alignment with said ball rolling grooves of said track rail along an arcuate shape of predetermined curvature, and non-loading ball passages defined in said skirts adjacent to said ball rolling grooves;

a pair of lids mounted respectively on front and rear ends of said bearing block and having respective ball direction changing passages defined in respective inner surfaces thereof, said ball direction changing passages connecting ends of said ball rolling grooves and said non-loading ball passages to provide endless ball circulation paths; and a plurality of balls disposed to circulate in said endless ball circulation paths for bearing loads between said ball rolling grooves in said track rail and said ball rolling grooves in said bearing block.

14. A three-dimensional guiding apparatus according to claim 13, wherein said ball rolling grooves defined in said respective opposite side surfaces of said track rail are vertically juxtaposed, and said ball rolling grooves defined in said respective skirts of said bearing block are vertically juxtaposed.

15. A three-dimensional guiding apparatus according to claim 13, wherein said ball rolling grooves defined in said opposite side surfaces of said track rail are disposed one on each side of said opposite side surfaces of said track rail, and two ball rolling grooves are defined in an upper surface of said track rail and juxtaposed, and said ball rolling grooves defined in said skirts of said bearing block are disposed one on each side of said skirts of said bearing block, and two ball rolling grooves are defined in a lower surface of said connecting portion of said bearing block and juxtaposed along an arcuate surface of predetermined curvature in alignment with said ball rolling grooves on the upper surface of said track rail.

16. A three-dimensional guiding apparatus according to claim 13, wherein said ball rolling grooves defined in said opposite side surfaces of said track rail are disposed one on each side of said opposite side surfaces of said track rail, and two roller rolling surfaces on which cylindrical rollers roll are defined on an upper surface of said track rail and juxtaposed, and said ball rolling grooves defined in said skirts of said bearing block are disposed one on each side of said skirts of said bearing block, and two roller rolling surfaces on which cylindrical rollers roll are defined on a lower surface of said connecting portion of said bearing block and juxtaposed along an arcuate surface of predetermined curvature in alignment with said roller rolling surfaces of said track rail.

17. A three-dimensional guiding apparatus according to claim 13, wherein said intermediate member comprises a universal joint.

18. A three-dimensional guiding apparatus according to claim 13, wherein said intermediate member comprises an elastic member and upper and lower attachment plates disposed above and below said elastic member.

19. A three-dimensional guiding apparatus according to claim 6, wherein a plurality of said curved guiding apparatuses are juxtaposed between at least one of said base and said intermediate member and between said intermediate member and said moving base.

20. A three-dimension guiding apparatus according to claim 6, wherein each of said first and second curved guiding apparatuses has a plurality of bearing blocks mounted on said track rail thereof.

21. A three-dimension guiding apparatus according to claim 7, wherein each of said first and second curved guiding apparatuses has a plurality of bearing blocks mounted on said track rail thereof.

22. A three-dimension guiding apparatus according to claim 6, wherein each of said ball rolling grooves in said track rail and said skirts of each of said first and second curved guiding apparatuses has an arcuate surface having a radius of curvature slightly greater than the radius of said ball, said ball being held in contact with each of said ball rolling grooves at two confronting points, and wherein a straight line interconnecting the point of contact of said ball is inclined to a vertical line along which loads are applied, by an angle (θ) of 90° or less.

23. A three-dimension guiding apparatus according to claim 7, wherein each of said ball rolling grooves in said track rail and said skirts of each of said first and second curved guiding apparatuses has an arcuate surface having a radius of curvature slightly greater than the radius of said ball, said ball being held in contact with each of said ball rolling grooves at two confronting points, and wherein a straight line interconnecting the point of contact of said ball is inclined to a vertical line along which loads are applied, by an angle (θ) of 90° or less.

24. A three-dimension guiding apparatus according to claim 8, wherein each of said ball rolling grooves in said track rail and said skirts of each of said first and second curved guiding apparatuses has an arcuate surface having a radius of curvature slightly greater than the radius of said ball, said ball being held in contact with each of said ball rolling grooves at two confronting points, and wherein a straight line interconnecting the point of contact of said ball is inclined to a vertical line along which loads are applied, by an angle (θ) of 90° or less.

25. A three-dimension guiding apparatus according to claim 6, wherein each of said skirts comprises a skirt body and a lid mounted on an end of said skirt body in a direction in which said skirt moves, said skirt body having a ball delivery passage and said lid having a ball direction changing passage interconnecting a loading ball passage and a non-loading ball passage, the ball delivery passage and the ball direction changing passage jointly serving as said non-loading ball passage.

26. A three-dimension guiding apparatus according to claim 7, wherein each of said skirts comprises a skirt body and a lid mounted on an end of said skirt body in a direction in which said skirt moves, said skirt body having a ball delivery passage and said lid having a ball direction changing passage interconnecting a loading ball passage and a non-loading ball passage, the ball delivery passage and the ball direction changing passage jointly serving as said non-loading ball passage.

27. A three-dimension guiding apparatus according to claim 8, wherein each of said skirts comprises a skirt body and a lid mounted on an end of said skirt body in a direction in which said skirt moves, said skirt body having a ball delivery passage and said lid having a ball direction changing passage interconnecting a loading ball passage and a non-loading ball passage, the ball delivery passage and the ball direction changing passage jointly serving as said non-loading ball passage.

28. A three-dimension guiding apparatus according to claim 9, wherein each of said skirts comprises a skirt body and a lid mounted on an end of said skirt body in a direction in which said skirt moves, said skirt body having a ball delivery passage and said lid having a ball direction changing passage interconnecting a loading ball passage and a non-loading ball passage, the ball delivery passage and the ball direction changing passage jointly serving as said non-loading ball passage.

29. A three-dimension guiding apparatus according to claim 6, wherein an elastic member is disposed on at least one of a lower surface of said base and an upper surface of said moving base.

30. A three-dimension guiding apparatus according to claim 7, wherein an elastic member is disposed on at least one of a lower surface of said base and an upper surface of said moving base.

31. A three-dimension guiding apparatus according to claim 8, wherein an elastic member is disposed on at least one of a lower surface of said base and an upper surface of said moving base.

32. A three-dimension guiding apparatus according to claim 9, wherein an elastic member is disposed on at least one of a lower surface of said base and an upper surface of said moving base.

33. A three-dimension guiding apparatus according to claim 10, wherein an elastic member is disposed on at least one of a lower surface of said base and an upper surface of said moving base.

34. A three-dimension guiding apparatus according to claim 6, wherein said intermediate member comprises two upper and lower members, with an elastic member disposed between said two upper and lower members.

35. A three-dimension guiding apparatus according to claim 7, wherein said intermediate member comprises two upper and lower members, with an elastic member disposed between said two upper and lower members.

36. A three-dimension guiding apparatus according to claim 8, wherein said intermediate member comprises two upper and lower members, with an elastic member disposed between said two upper and lower members.

37. A three-dimension guiding apparatus according to claim 9, wherein said intermediate member comprises two upper and lower members, with an elastic member disposed between said two upper and lower members.

38. A three-dimension guiding apparatus according to claim 10, wherein said intermediate member comprises two upper and lower members, with an elastic member disposed between said two upper and lower members.

39. A three-dimension guiding apparatus according to claim 11, wherein said intermediate member comprises two upper and lower members, with an elastic member disposed between said two upper and lower members.

* * * * *